United States Patent
Ebneter et al.

(10) Patent No.: US 12,445,813 B2
(45) Date of Patent: Oct. 14, 2025

(54) METHOD FOR CONFIGURING CONVERTERS FOR SENSORS AND CONVERTER

(71) Applicant: VERATRON AG, Rüthi (CH)

(72) Inventors: Martin Ebneter, Rebstein (CH); Markus Hasler, Montlingen (CH)

(73) Assignee: Veratron AG, Rüthi (CH)

( * ) Notice: Subject to any disclaimer, the term of this patent is extended or adjusted under 35 U.S.C. 154(b) by 351 days.

(21) Appl. No.: 17/923,272

(22) PCT Filed: May 4, 2020

(86) PCT No.: PCT/IB2020/054233
§ 371 (c)(1),
(2) Date: Nov. 4, 2022

(87) PCT Pub. No.: WO2021/224657
PCT Pub. Date: Nov. 11, 2021

(65) Prior Publication Data
US 2023/0292093 A1 Sep. 14, 2023

(51) Int. Cl.
*H04B 5/00* (2024.01)
*H04B 5/72* (2024.01)
(Continued)

(52) U.S. Cl.
CPC ............ *H04W 4/38* (2018.02); *H04B 5/72* (2024.01); *H04W 4/80* (2018.02)

(58) Field of Classification Search
CPC . H04W 4/38; H04W 4/80; H04B 5/72; H04B 5/00; H04B 5/0031
See application file for complete search history.

(56) References Cited

U.S. PATENT DOCUMENTS

| 7,825,776 B2 | 11/2010 | Smith et al. |
| 8,718,554 B2 | 5/2014 | Abel |

(Continued)

FOREIGN PATENT DOCUMENTS

| CN | 107 302 622 A | 10/2017 | |
| CN | 107302622 | * 10/2017 | ............. G08C 17/02 |

(Continued)

OTHER PUBLICATIONS

International Search Report Corresponding to PCT/IB2020/054233 mailed Jan. 22, 2021.

(Continued)

*Primary Examiner* — Tuan H Nguyen
(74) *Attorney, Agent, or Firm* — Finch & Maloney PLLC

(57) ABSTRACT

The invention relates to a method for configuring converters for sensors and displays and in particular to a sensing and displaying system comprising
a sensor which senses information and delivers information data to a converter of claim 1 when in operation, whereby said converter converts said information data to display data and delivers said display data to a display when in operation and wherby said converter contains a microprocessor as a controller and a first NFC communication module which is connected to said microprocessor and whereby said microprocessor contains modifiable instructions to run said microprocessor and said converter and whereby said modifiable instructions are adapted to be modified through input data which can be delivered to said microprocessor through said NFC communication channel;
wherein the function of said converter can be adapted according to an instruction App which can be loaded into a mobile device or mobile phone which employs a second NFC communication module, which will be in (Continued)

Sensor Analog Output

Sensor Digital Output communication with said first NFC communication module, when in communication mode in order to program said microprocessor. With the invention various sensors can be coupled with various indicators and the converter is programmed through an NFC communication channel by a mobile device. Further instruments can be programmed and adapted to the respective needs through the NFC communication channel by said mobile device.

16 Claims, 30 Drawing Sheets

(51) Int. Cl.
*H04W 4/38* (2018.01)
*H04W 4/80* (2018.01)

(56) References Cited

U.S. PATENT DOCUMENTS

| | | | |
|---|---|---|---|
| 9,058,550 B2 | 6/2015 | Zhao et al. | |
| 9,184,801 B2 | 11/2015 | Li et al. | |
| 9,197,312 B2 | 11/2015 | Wendling et al. | |
| 2018/0160257 A1* | 6/2018 | Ebneter | H04W 4/40 |
| 2019/0155592 A1 | 5/2019 | Vornwald et al. | |

FOREIGN PATENT DOCUMENTS

| | | |
|---|---|---|
| CN | 108 901 009 A | 11/2018 |
| EP | 2 119 946 A1 | 6/2010 |
| EP | 3 035 552 A1 | 6/2016 |
| KR | 10 2017 0132407 A | 12/2017 |

OTHER PUBLICATIONS

Supplemental Search Report Corresponding to PCT/IB2020/054233 mailed May 9, 2022.
Written Opinion Corresponding to PCT/IB2020/054233 mailed Jan. 22, 2021.

* cited by examiner

Sensor Analog Output

Sensor Digital Output

3a

Digital instrument with analog pointer information. Grafic not changeable

Instrument Analog Information

3b

Digital instrument with digital graphic information. Grafic is changeable

Instrument Digital Information

4

Mobile Device with active radio signal eg. Cell Phone, Tablet, PC, Master Sample, etc.

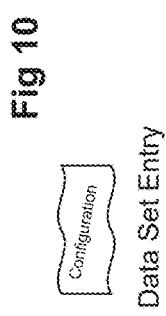
Fig 6
Broken Part
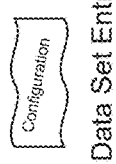
Fig 7
Radio Signal
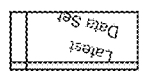
Fig 8
Read by User
Fig 9
Altering Time
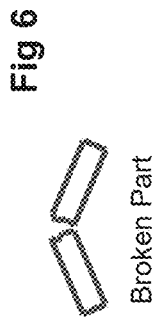
Fig 10
Data Set Entry
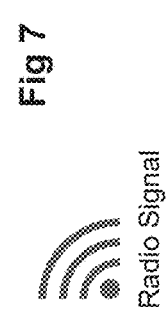
Fig 11
Data Set Exit
Fig 12
Vehicle
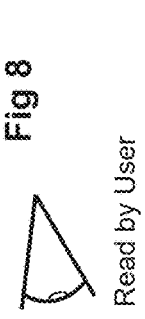
Fig 13
App veratron
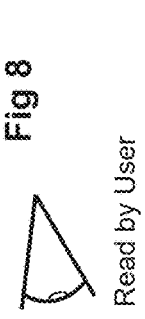
Fig 14
Information TAG
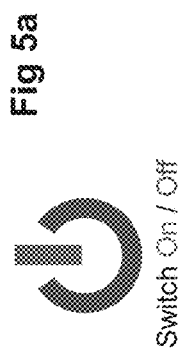
Fig 5a
Switch On / Off
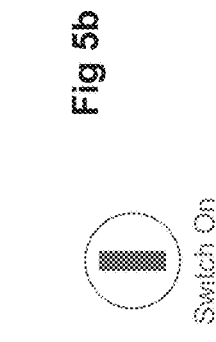
Fig 5b
Switch On
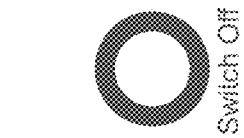
Fig 5c
Switch Off
Vehicle Power Independent or On or Off

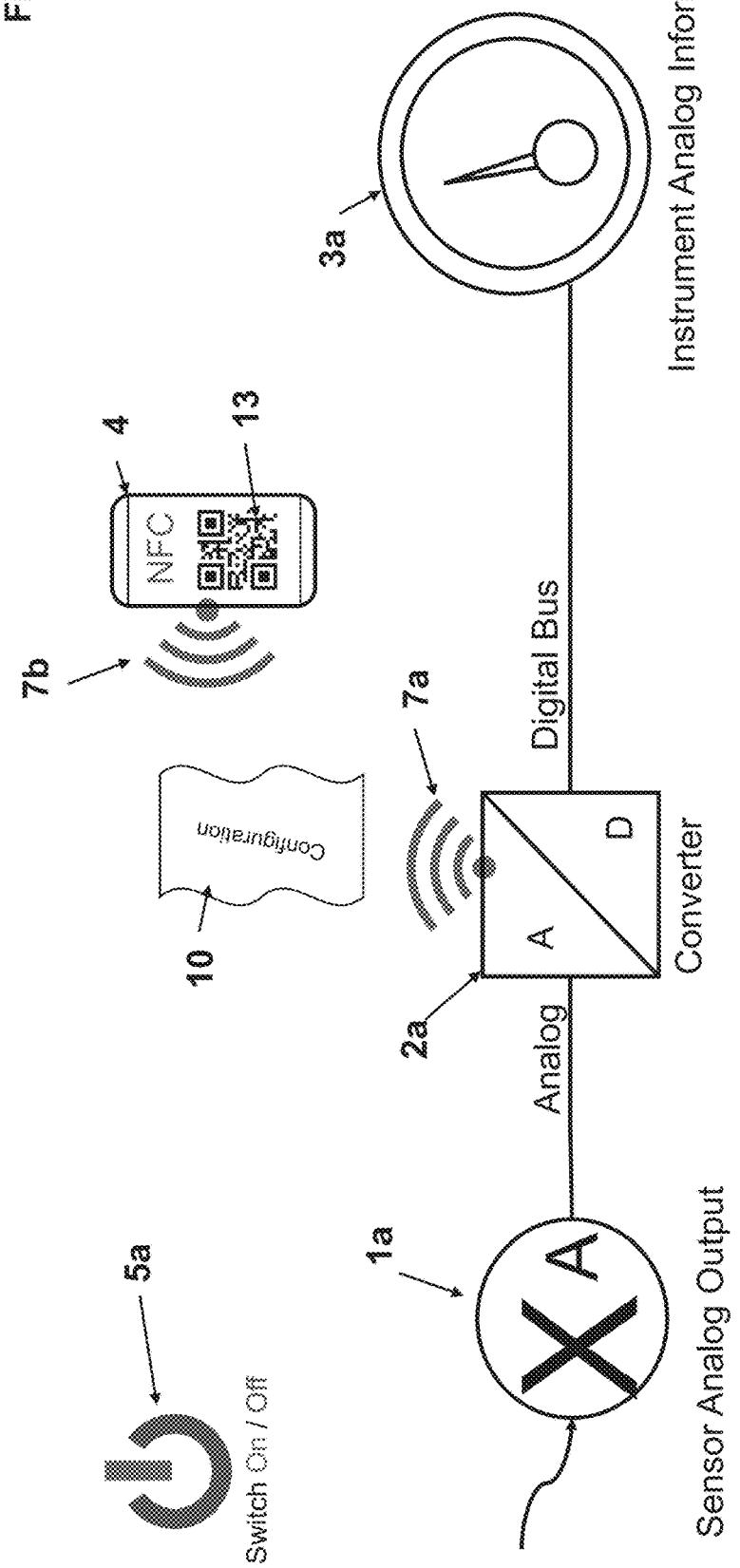

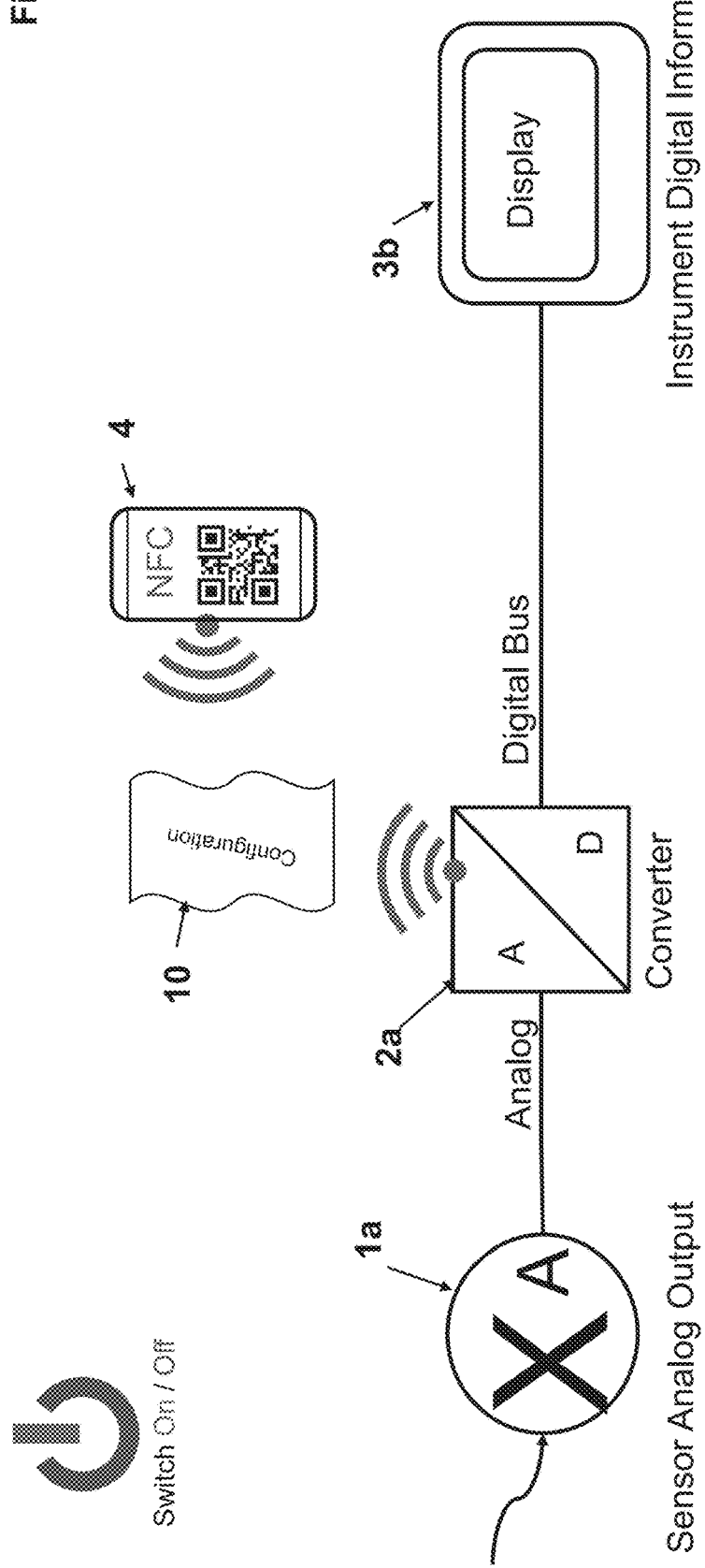

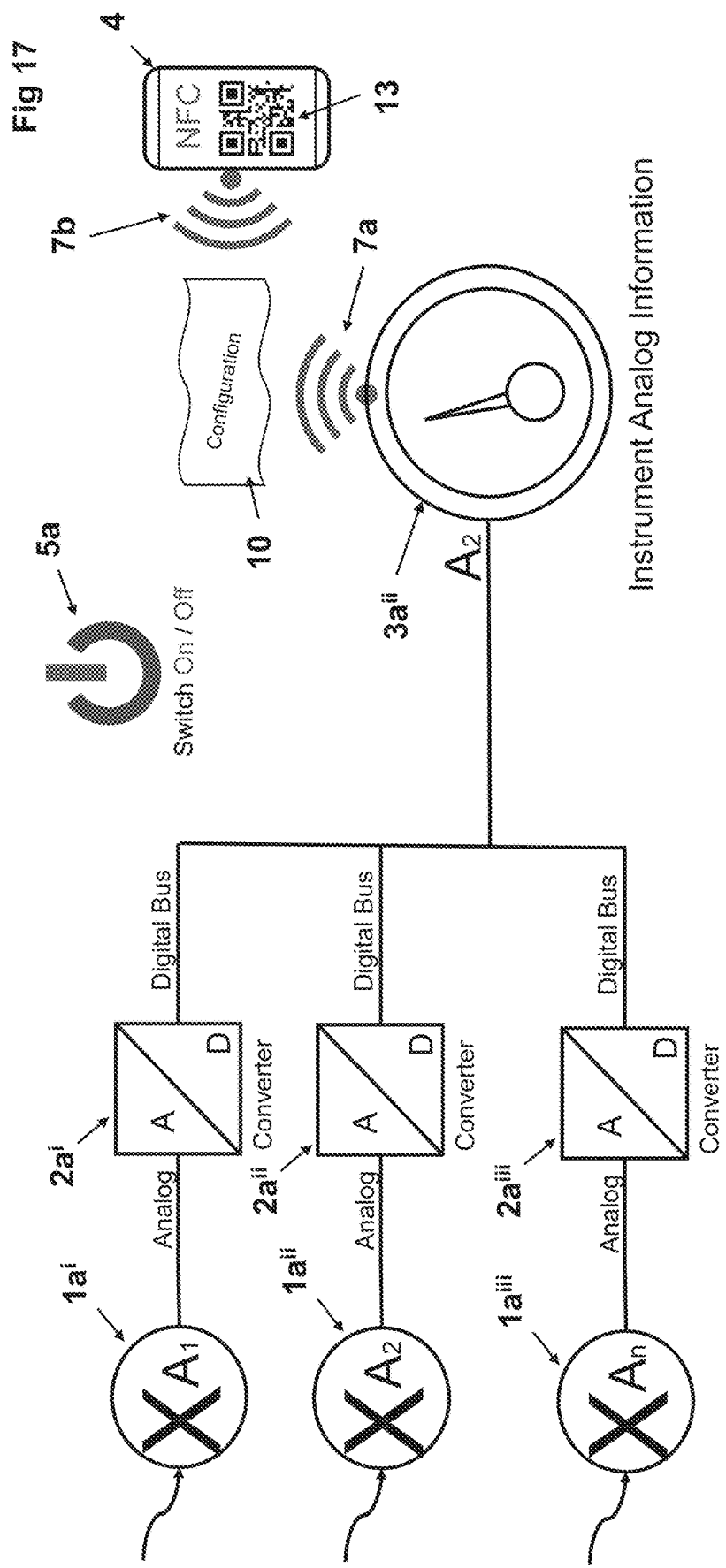

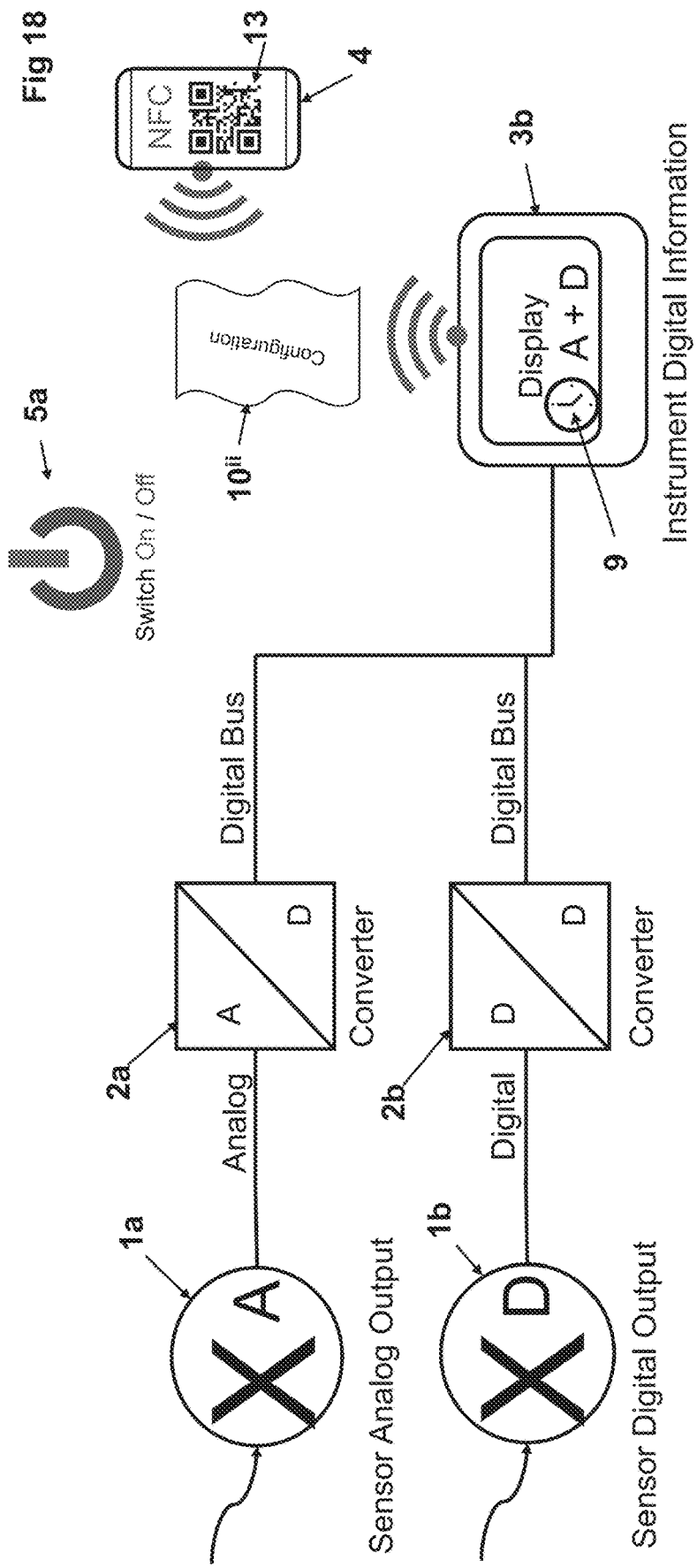

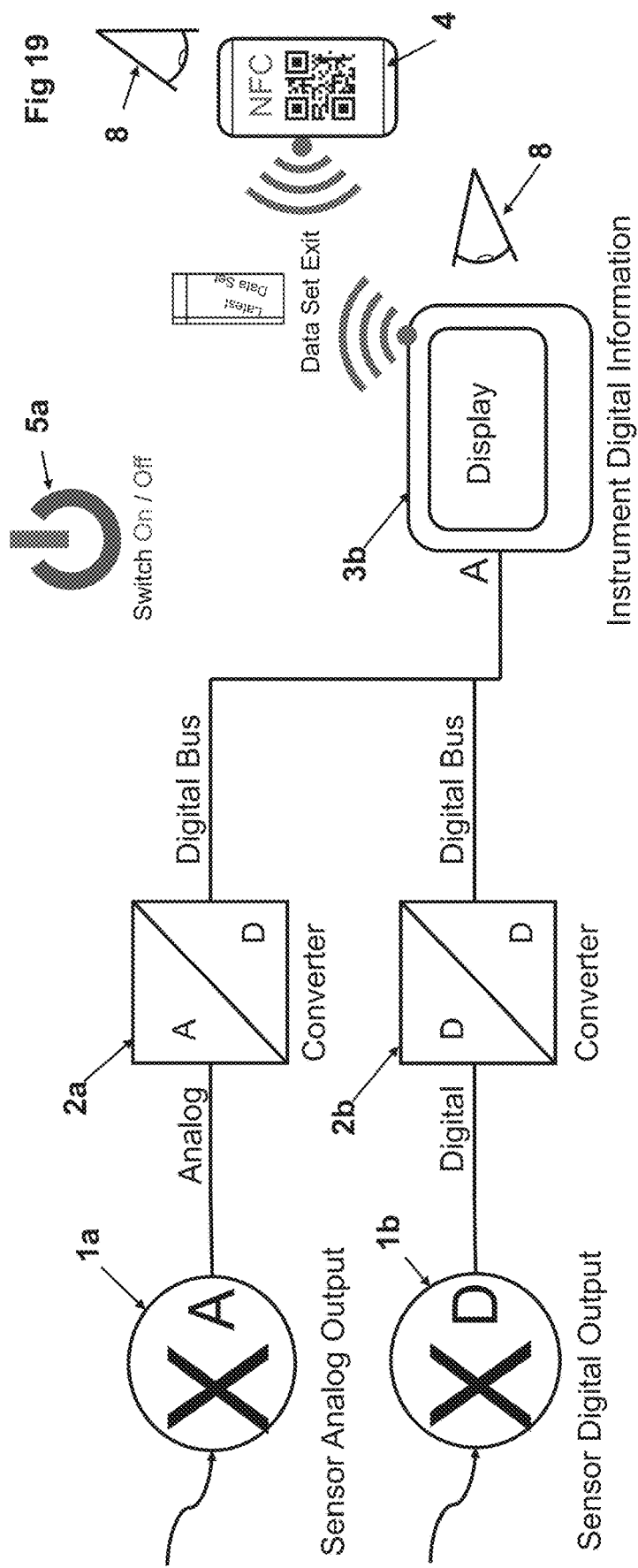

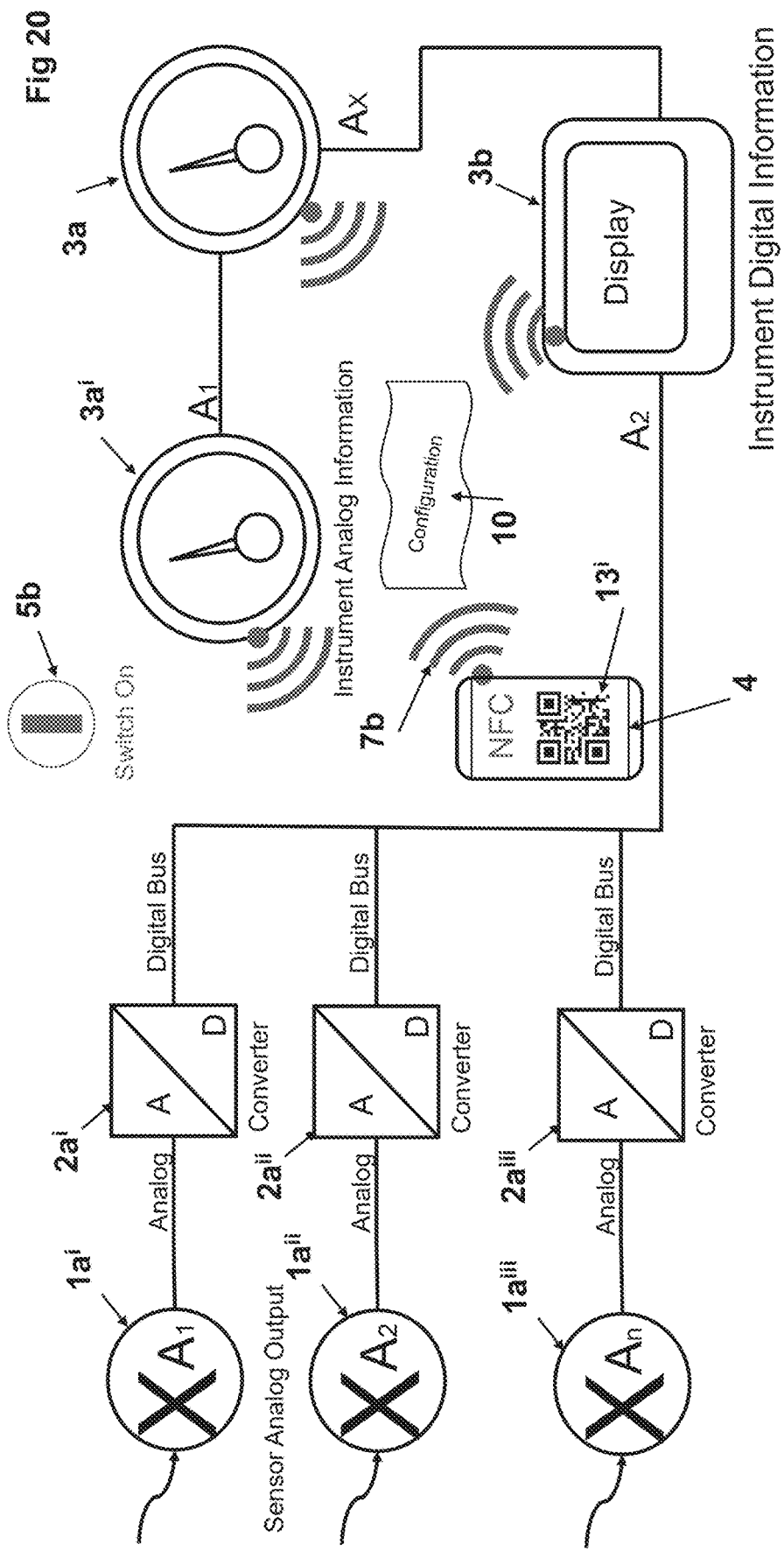

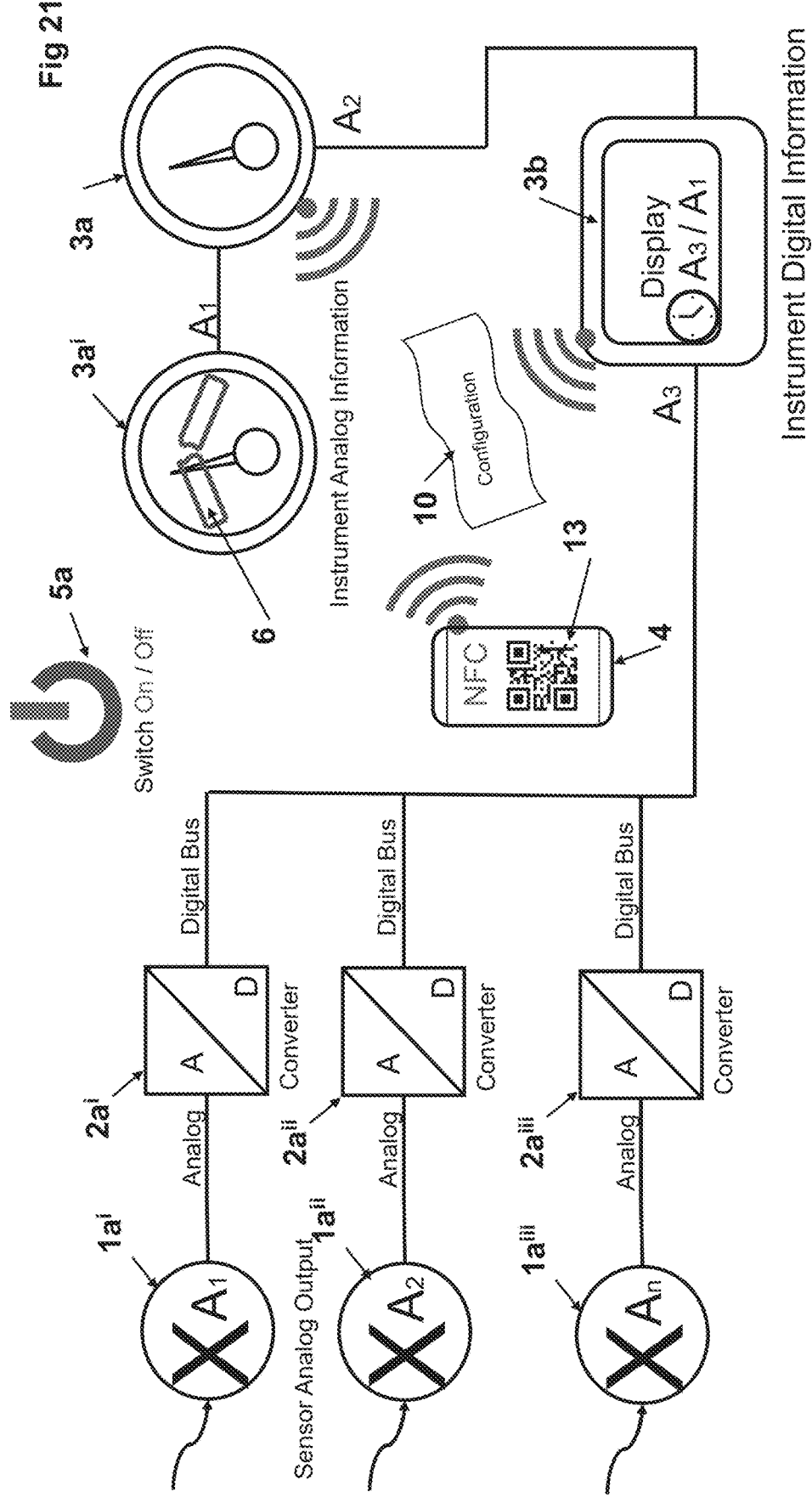

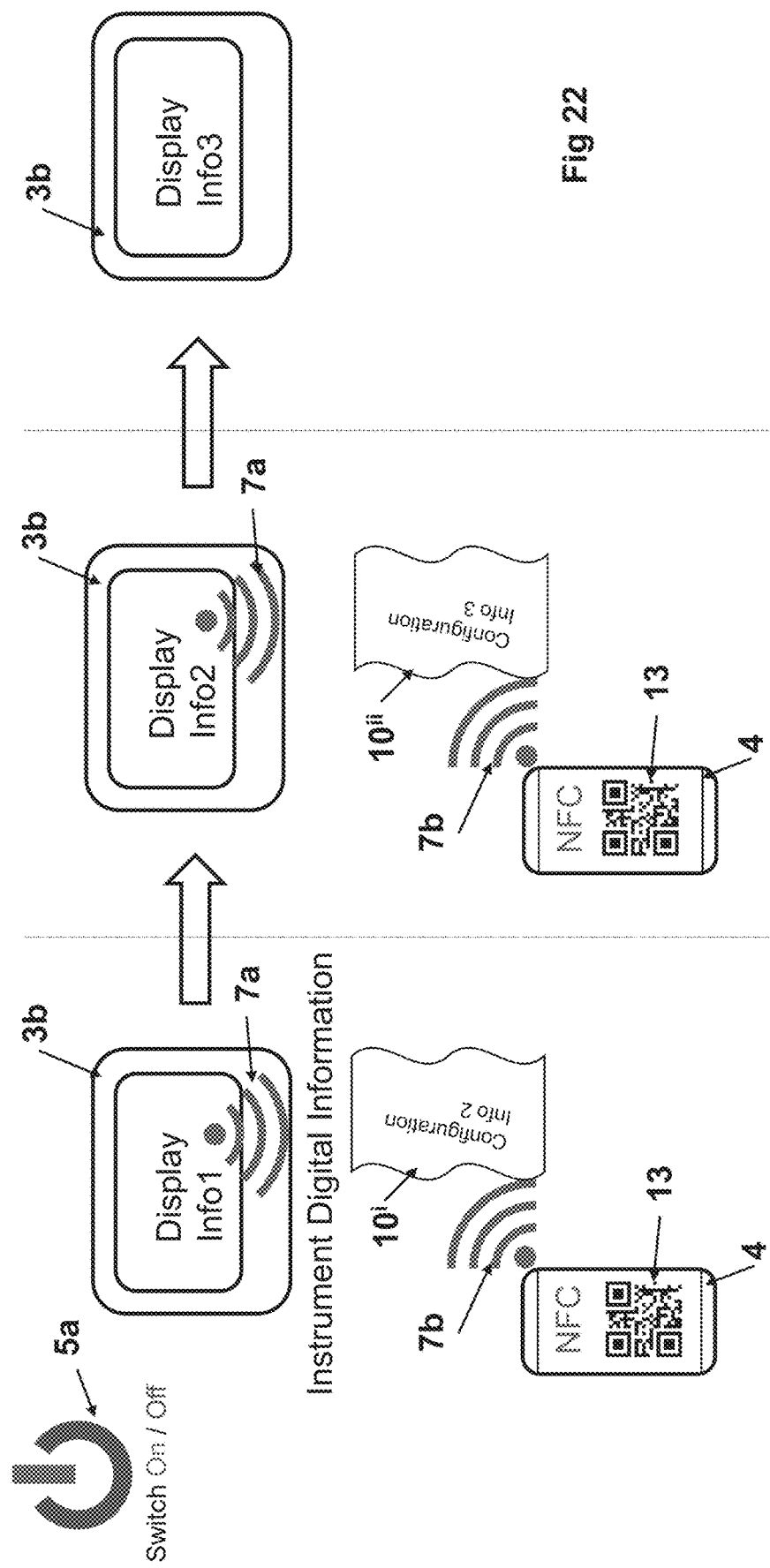

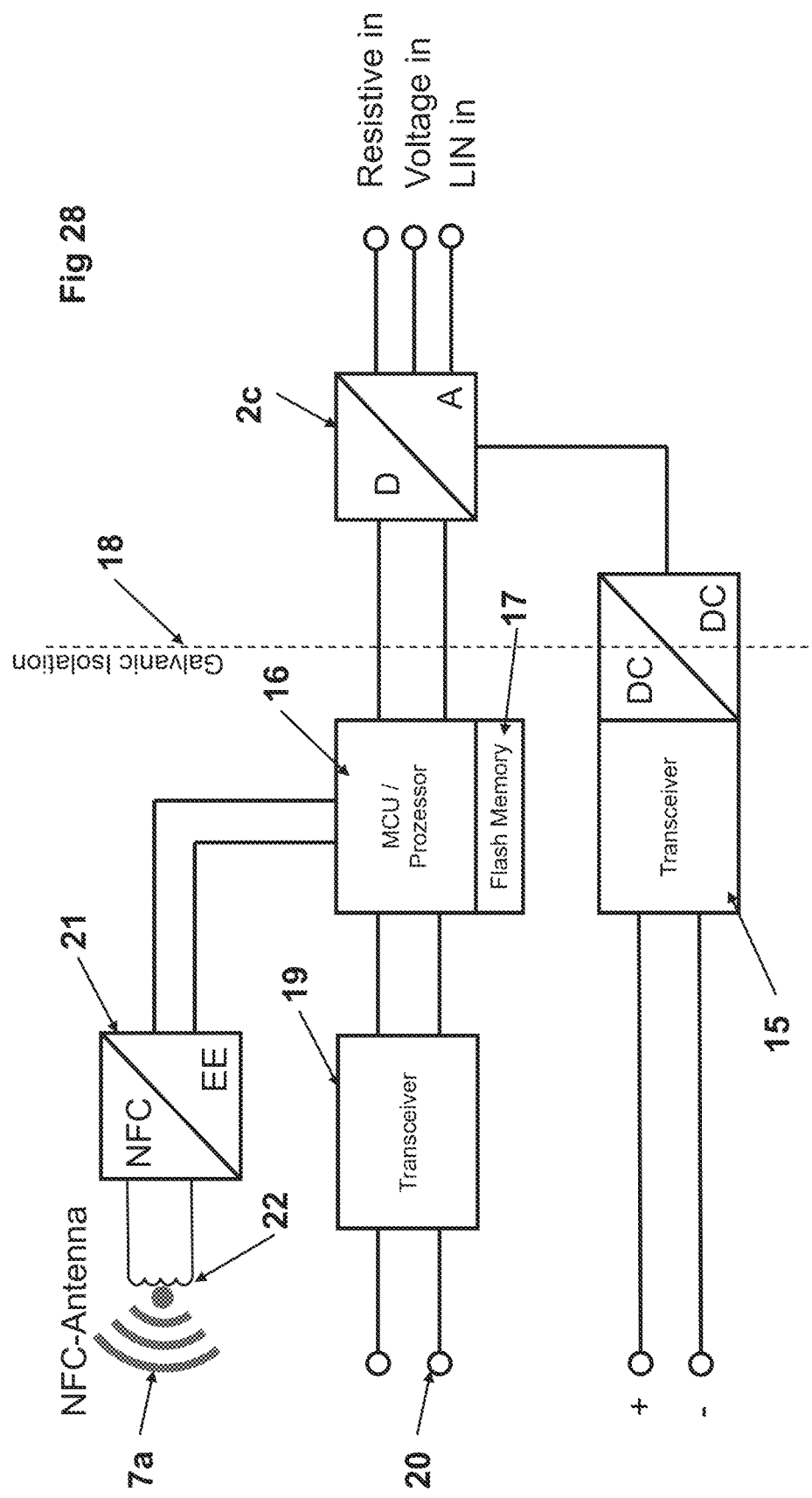

NMEA = tbd standard

Example of a digital to digital conversion from an engine bus to to displays

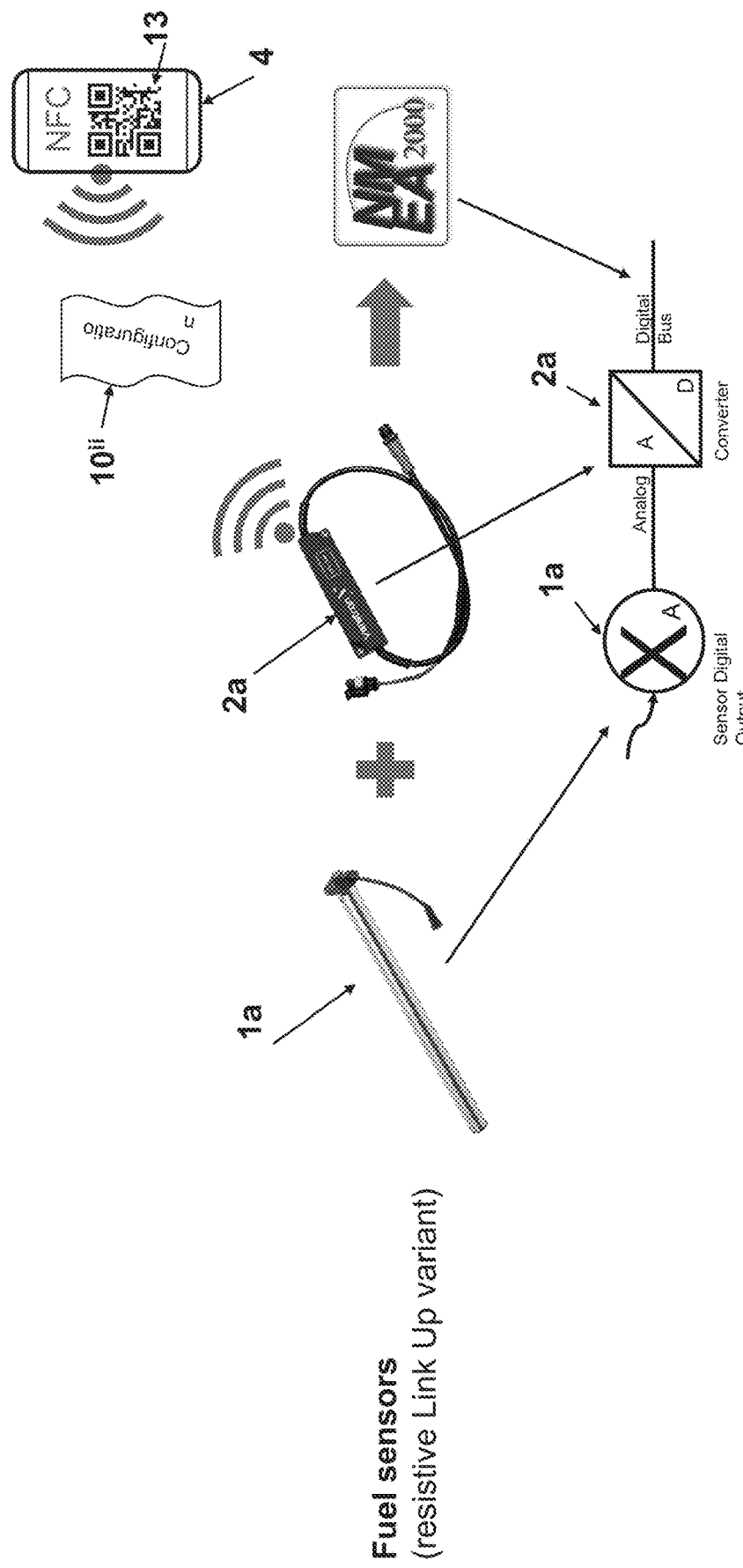

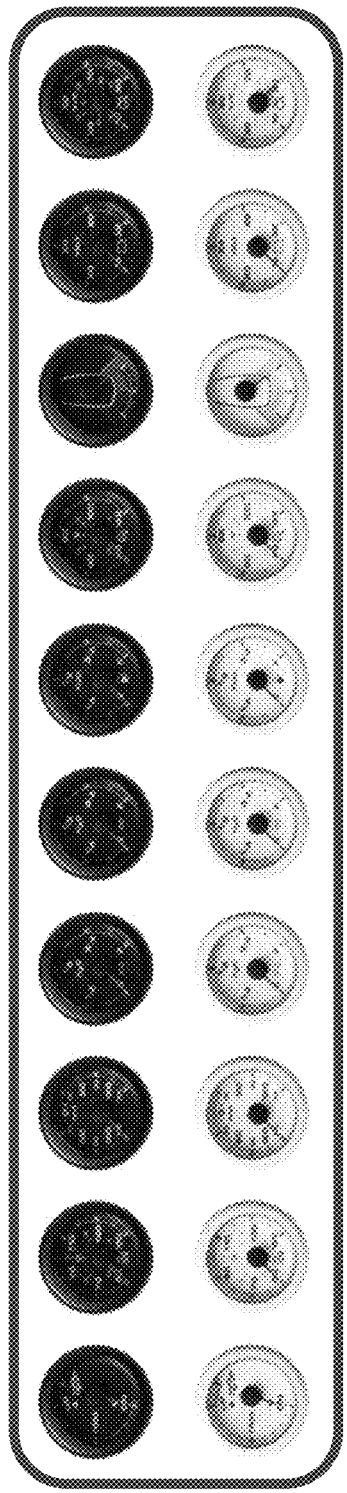
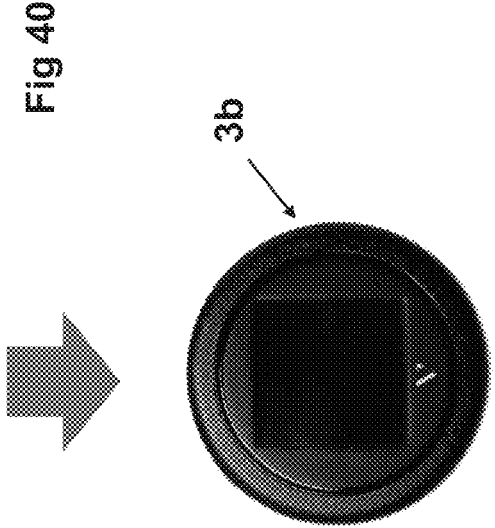

Fig 40

Figure 23:
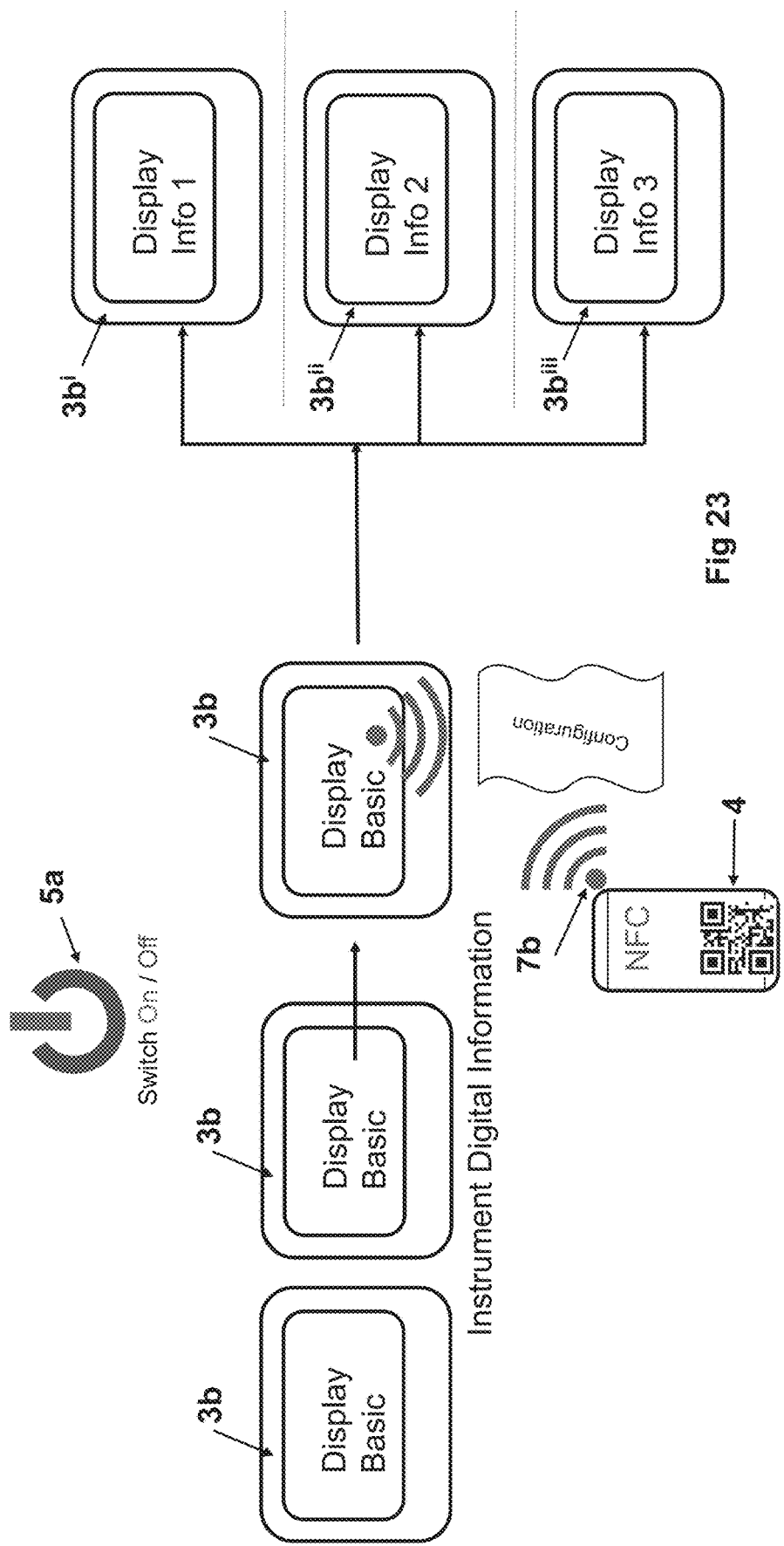

- Examples to example of Fig. 23
- To date, many round gauges variants are available for engine and vessel monitoring
- Dashes are "overcrowded" with single-function gauges
- End customers have to sometimes face with discontinued articles, making it hard to replace THAT gauge
- The invention introduces now the UNIVERSAL gauge, which can at any time replicate all the gauges, in just one device or substitute any of THAT gauges or any group of THAT gauges!
- See the following three pages of drawings how to use the invention Step 1

➢ The veratron "EasyLink Plus" companion App for smartphones is used to setup the instrument ➢ The instrument type can be chosen among a full list of available gauges, like:

➢ Fuel Level
➢ Trim Position
➢ Rudder Angle
➢ Battery Voltage
➢ Engine Temperatures and Pressures ➢ Dual split screen also possible The App graphical rendering might differ

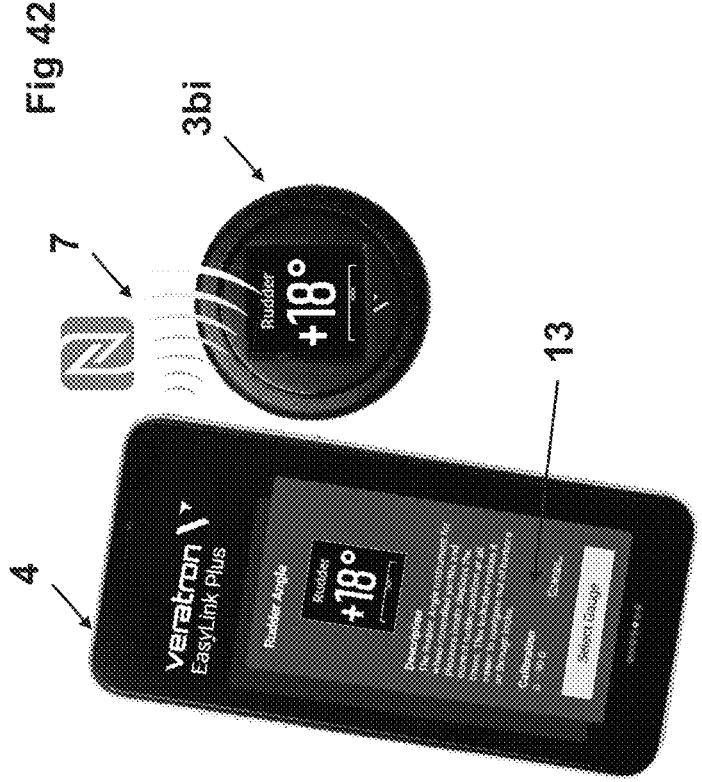

Fig 42

Step 2

- Simply select the gauge type and "tap" your smartphone onto the front lens of the instrument to set it

- Thanks to the passive NFC antenna desinged into the gauge, it does not strictly need to be powered to be programmed!

- This brings a great advantage to the dealers/shops as they are able to program a certain gauge-type with the device still into its blister package!

- They will also benefit by having to manage one single item only in their stock instead of maintaining a whole portfolio in their warehouse!

Fig 43

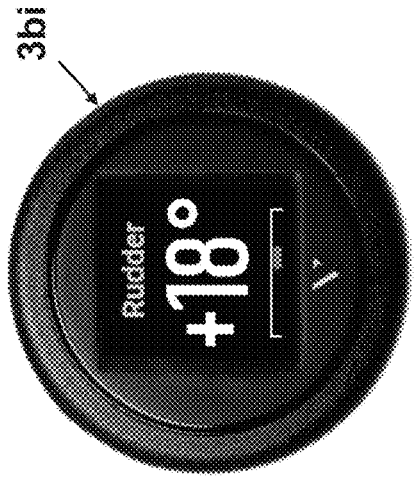

3bi

Step 3

- All the gauge in only one gauge
- One single article to be managed by retailers/shops
- No more discontinued articles: every gauge-type can be always reproduced
- Powerless NFC configuration from smartphone
- More than a gauge: TFT display with simple graphics
- 2 variants available: EasyLink satellite and Standalone
- Analogue inputs and NMEA 2000 connectivity available in the Standalone variant with NMEA 2000 gateway
- Flexible design (bezels, dial colors) to match the aesthetic of pre-existing VDO Marine gauges

METHOD FOR CONFIGURING CONVERTERS FOR SENSORS AND CONVERTER

CROSS-REFERENCE TO RELATED APPLICATIONS

The present application claims relationship to German Patent application. 10 2016 244158.3, and to the US Patent application 2018/0160257 which were invented by the same inventors. The German Patent application. 10 2016 244158.3 is assigned to the same assignee as the present application. The US Patent application 2018/0160257 is abandoned. Both aforementioned applications are herewith incorporated by reference and or by copying certain text elements into this application.

FIELD OF THE INVENTION

The present invention relates to a method for configuring a first device namely a converter by means of a second mobile device like a mobile phone or a tablet or another mobile data input device utilizing NFC, and to corresponding sensor devices and to a corresponding display device. Wherein the converter converts sensor data to displayable information on the display device.

BACKGROUND AND OBJECTS OF THE INVENTION

EP 3 035 552 A1 discloses the general concept of carrying out configuration information for a device by means of near field communication, also known as NFC, from a mobile device. Here, configuration information is firstly loaded from the device onto the mobile device through the NFC communication channel and modified there, and the modified configuration information is transmitted back from the mobile device to the device through the same NFC communication channel.

U.S. Pat. No. 9,058,550 B2, EP 2 199 946 A1 and U.S. Pat. No. 9,184,801 B2 present the general concept of transmitting configuration information by means of near field communication, but here to a switched-off device whose near field communication module buffers the configuration information and transmits it to the device after said device has been switched on. U.S. Pat. No. 7,825,776 B2 also discloses a corresponding buffering process.

In U.S. Pat. No. 8,718,554 B2, in addition to the near field communication at least one further wireless communication channel is opened and used in order to transmit configuration data from one device to another device through said further wireless communication channel.

U.S. Pat. No. 9,197,312 B2 discloses a system for near field communication. Inter alia, data is synchronized between two NFC devices, keys or other codes are transferred, user profiles are exchanged, or different automation functionalities of a building are accessed. This relates mor to a "physical" access control, like access badges or the like.

In other words, the use of NFC communication is widely known for retrieving data from devices and for wireless feeding information into devices.

Instruments, devices and control units require in many applications, in particular in land vehicles or sea crafts, what is referred to as a set-up or a configuration which is often implemented via what is referred to as a CAN bus or other hard-wired connections. The set-up parameters are often stored locally in the device, usually as what is referred to as firmware, by means of a firmware update in a read-only memory, referred to as an EEPROM. The connections via a CAN bus or some other hard-wired data bus are expensive, complex or difficult to handle, in particular if a specific further device is necessary.

The object of the invention described in the US Patent application 2018/0160257 was to specify a further way of configuring a device, in particular by Applying the near field communication which is referred to in the following text by the abbreviation NFC.

A method according to the invention for configuring a first device by means of a second mobile device comprises the following steps to be carried out by the first device: detection of an active NFC device by means of an NFC module, in the passive NFC mode, of the first device. If the active NFC device is the second mobile device, the first device transmits status feedback by means of its NFC module in the passive NFC mode. Otherwise, detection is carried on without outputting feedback. After the outputting of the status feedback, configuration data which is emitted by the active NFC device is received by the NFC module in the passive NFC mode. The received configuration data is stored in a configuration data memory of the first device. Subsequently, either an automatic configuration process of the first device starts on the basis of the stored configuration data or, if no separate configuration step is necessary, the device is operated directly in accordance with the newly stored configuration data.

The method according to the prior filed US Patent application 2018/0160257 has the advantage that the NFC module serves only to set up a data connection and to perform data transfer, but no storage of data takes place there locally. This increases the protection against prohibited reading or writing of data from or into the NFC module before or after the execution of the configuration method.

Therefore, data tampering and the theft of data are made more difficult. The use of near field communication additionally facilitates the handling and eliminates a certain degree of expenditure on wiring. Also, because the NFC module in the passive mode does not need electrical energy from an internal source, the first device can be programmed "in the box". This has a big advantage, as it allows e.g. that any first device with any features can be programmed by said NFC module so that it changes its features and properties. That means in turn, when a salesman has e.g. 5 identical first devices on stock, he can change these without any complicated wiring into dedicated converter devices according to the particular needs. He simply goes with a mobile device containing an active NFC module close to the box containing one of those 5 identical first devices and feeds the required data through the NFC communication channel through the box (which typically is made from plastics or paperback) into the converter device.

The method of the US Patent application 2018/0160257 discloses as stated in the US Patent application 2018/0160257 an application for configuring a first device by means of a second mobile device and has the following concrete steps to be carried out by the second mobile device:

Configuration data is produced for the first device in a configuration data producing device, which could be a computer, a tablet or a mobile phone or the like. Then, status information is emitted in the active NFC mode from the mobile device. It is detected whether status feedback of a device takes place in the passive NFC mode. This could be such a device in a paperback box. If this is the case and if the detected device is the first device, the configuration data which was produced on the mobile device or loaded into the mobile device from a computer or the like is transmitted to the first device through the NFC Communication channel of the NFC module of the mobile device. The second device is preferably a mobile device (mobile telephone or tablet) but it could be also a special NFC module input device. The production of the configuration data can therefore take place at any desired location it needs just to be loaded into the input device or second mobile device respectively. However, said input device and said mobile device could also be adapted to allow programming of said configuration data. In order to transmit the configuration data to the first device, the second mobile device is moved into its vicinity, so that a near field communication connection (NFC) can be set up. The data is then transmitted via this communication channel connection. Since all the configuration data has already been produced at this time, the inputting of information at the second mobile device is at that time largely eliminated and the transmission of the configuration data takes place without a large amount of expenditure. This is advantageous in particular if, as a result of the surroundings in which the first device is located, such inputs or the like are possible only with difficulty or in a laborious fashion, for example owing to restricted installation space. Further this is advantageous in so far as the communication channel through the NFC mode is only a short time open. This in turn makes it difficult for third parties to eventually get access to any of the exchanged data, because the timing will not match properly for them.

It is also within the scope of the US Patent application 2018/0160257 application and the invention to produce the configuration data firstly on a third device like a computer or a notebook, then transmit the data to the second mobile device and then from this mobile device to the first device by means of NFC. The transfer of data from the thrid device to the second mobile device could be also by means of NFC or by ordinary means via USB-cable or the like. This has the advantage that a relatively small mobile device which does not have to be particularly well designed for inputting data can be easily used as the mobile device. The data input is then carried out largely on a third device which is more suitable for this purpose, for example a fixed or a mobile computer with a large screen and convenient input means. The transmission from said device to the second device is carried out in a wire-bound or wireless fashion, locally, in a data network, on the Internet or the so-called Cloud. These refinements are also covered by the term of the production of configuration data on the second mobile device.

Authentication of the respective devices and/or of the data received thereby is advantageously carried out. By means of the authentication of the respective devices it is checked whether the respective device is a device which is suitable for the configuration method, in particular whether the converter device is Approved for this specific mobile device for the configuration method according to the invention. Furthermore, it is checked whether the configuration data meets certain predefined or pre-definable safety requirements and whether it is suitable and Approved for overwriting configuration data of the device which is possibly present.

The NFC communication is preferably preceded by a set-up of a connection between the first device and the NFC module of the first device. Subsequent to the NFC communication, the corresponding connection is disconnected. This has the advantage that the device can be configured only if it is connected to the NFC module. This gives rise to an additional gain in safety since an inadvertent or illegitimate configuration owing to the lack of a connection cannot then take place. This, however, has also the big advantage, that in case many first devices are close to each other, only a single one of them can be connected through the NFC communication channel, whereby the other first devices would be disconnected from this option. Certainly, this measure would also temporarily disconnect the passive NFC mode ability of the first device.

In a preferred embodiment the NFC modules are always fix installed at the first devices and/or at the second mobile devices-however, the invention covers also systems at which the NFC module is an independent device which can be connected and disconnected from the first converter device and/or second mobile device. Furthermore, in such systems after the NFC module has been disconnected from the first device it can be used to configure further devices. Therefore, number of components, and as a result costs, are reduced or eliminated. The connection set-up is carried out in a physical fashion here, for example a mechanical and electrical connection is established by means of a plug-type connection. As an alternative to this, the connection set-up takes place in a functional fashion, that is to say without setting up or disconnecting a physical connection, for example via a data bus by assigning the corresponding device to an NFC module which is also located on the data bus. In this way, the advantages of a data bus, for example of the CAN bus, and the advantages of the near field communication are combined with one another.

A storage medium according to the invention contains instructions which, when they are executed by one or more processors of a device, cause the device to execute the method. The storage medium is here a data carrier such as a floppy disk, optical storage medium, USB stick, hard disk or some other suitable storage medium, which can be directly or indirectly connected to the second mobile device, The current Patent application takes benefit of the above described techniques according to the US Patent application 2018/0160257. The invention is suitable for carrying out the method according to one or more of the method claims of said US patent application. In particular, such a first device has a configuration data memory, an NFC module which is operated in the passive NFC mode, at least one configurable module and/or a configurable control unit. The NFC module is, according to one advantageous embodiment, a separate component which can be used with the device and can also be disconnected again therefrom.

Advantages of these embodiments correspond to those which are specified with respect to the corresponding method. However, first devices having a fixed built in NFC module have also advantages, namely no manipulations are necessary and—as above explained—the configuration in the box is easily accomplished. The important difference between the device of said US Patent application and the current invention is that the first device is a converter, wherein the converter converts sensor data to displayable information on the display device and wherein the second mobile device sets up the converter to properly read and understand the sensor and to properly create relevant digital information data to be transmitted to instruments and to be displayed on them for the benefit of users who are in charge of using the information displayed on said instruments, The configuration data belongs to at least one of the types of data mentioned below. Locking data and unlocking data for locking or unlocking a converter device or sub-functions of a device. System setting data which serves to describe the system in which the device is located. This comprises, inter alia, settings for filling level sensors, the geometry of a liquid container, a system profile, predefined power limits of a motor or other parameter. Personalization data comprises, for example, logos which are displayed at the start of the device or when it is switched off or in specific operating situations, images, background images, pre-prepared texts, lists of favorites and the like. Vehicle data which is used jointly by a plurality of devices of a vehicle comprises, for example, rotational speed limits, switch-off conditions (also referred to by the expression "disabling features") and so on. Logbook data and information for collecting data is also included among the configuration data handled according to the invention. However also GPS data presentation, GPS data retrieval, programming of displays etc. can be performed with said invention.

This new application goes inventive steps further: The aim is to utilize the above described technologies from the said US Patent application in a new fashion and in order to improve "instrumentation" in general.

Under "instrumentation" this application understands a system (network) for use of sensors of any kind with first devices which are converting devices or converters of any kind and with indication devices of any kind and with input devices of any kind in combination so that either status information can be retrieved or controlling data could be sent through said system. Said sensors, converters, indication devices and input devices could be analog or digital or could be combinations thereof.

Sensors in the sense of this application have the task to retrieve information of any kind and make it available so that converters can use said information in a wanted manner.

Converters or converter devices according to this invention are independent devices which may adapt themselves on particular sensors or which may be adapted to program sensors so that they do what is needed or wanted. These convertors have also the ability to transfer sensor signals in a proper electronic way to indication devices, to control devices, to memories or the like.

To be more specific, the system creates a completely new method of utilizing instrumentation.

The invention is explained in more details along symbolic drawings.

Of course, the specified features are also modified and can be used appropriately in another sequence or in combination as described here and therefore fall under the protection of the patent claims.

BRIEF DESCRIPTION OF THE DRAWINGS AND DETAILED EMBODIMENTS

Apart from the previously mentioned advantages, advantages are also Apparent from the following description of exemplary embodiments with reference to the figures, of which:

Page 1 through 3 of the drawings present some symbols which are self-explanatory.

Figure 1A:
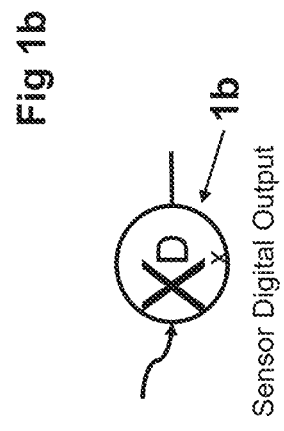
Figure 1B:
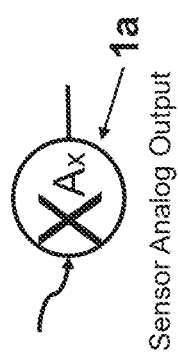
Figure 2A:
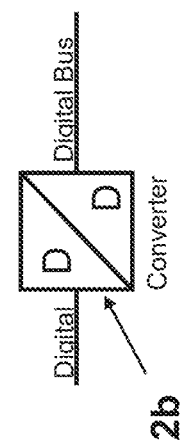
Figure 2B:
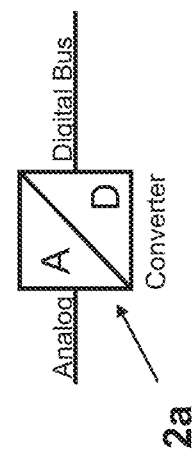

FIG. 1a symbolizes an analog output sensor and FIG. 1b symbolizes a digital output sensor FIGS. 2a and 2b symbolize converters to convert analog signals into digital signal and other convertors to convert special digital signals into other special digital signals.

It is a basic element of the invention, that always an NFC-programmable converter is provided, which is adapted to convert data according to a particular NFC-signal input, so as to either change the way of converting said signals between analog and digital or between digital and digital, and/or to feedback programming/controlling data (analog or digital) in order to modify the properties or working mode of said sensors.

Eventually these converters may also feedback programming/controlling data (analog or digital) in order to modify the properties or working mode of indicating devices like displays, optical or acoustic signals or the like, which have the purpose of presenting information gathered by said sensors. In any instance it is the task of these new type of converters to deliver proper signals to said indicating devices.

However, the special inventive property of these converters is that they are equipped with an NFC module working active and/or passive adapted to cooperate with a mobile device as explained above.

Hence, the further innovative development of the invention as filed with said US Patent application 2018/0160257 vests in the fact that the first device is a converter and said converter is connected with a sensor on the entrance of said converter and with an indicating device and/or with an input device. The input device as an alternative to an indicating device or as an add-on on an indicating device allows eventually to communicate with the sensor through the converter or allows to modify the convertor in cases where the NFC module is not available.

Figure 3A:
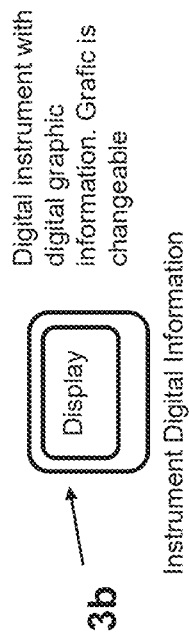
Figure 3B:
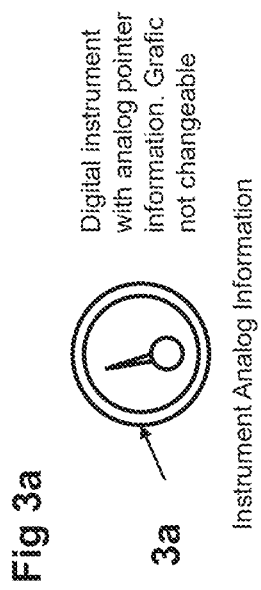

Such a converter could be seen as a hybrid converter, which may be addressed by the NFC module and/or alternatively by a conventional input device via wire (e.g. bus connection), FIGS. 3a and 3b symbolize a digital instrument with analog pointer information and a normal universal digital display. It is to be mentioned that preferably also these displays are equipped with an NFC module, so that their properties can be addressed and amended equally to the converter.

Figure 4:
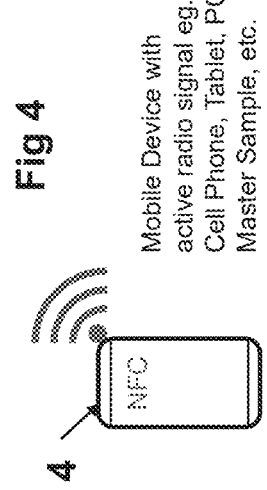

FIG. 4 discloses a mobile device equipped with an NFC module.

FIG. 5a to 5c symbolize a switch in various positions.

FIG. 6 symbolizes a broken part of any device

FIG. 7 indicates the radiation of an NFC communication module

FIG. 8 symbolizes ready by user or a user

FIG. 9 symbolizes alternating time

FIG. 10 symbolizes a data set or a software program which is to be transmitted through the NFC communication channel. Said set or program being adapted to modify at least the properties of the converter and/or eventually also the properties of the attached sensor 1 or display 3.

FIG. 11 symbolizes a data set exit.

FIG. 12 symbolizes a vehicle, in particular a ship.

FIG. 13 symbolizes a proprietary software or App respectively.

FIG. 14 symbolizes an Information tag with a passive or active NFC module to transmit data transferred to said information tag.

The following figures explain the invention by using the abovementioned symbols and functions FIG. 15 symbolizes a first typical set up (system) comprising an analog/digital converter 2a with an integrated NFC communication module creating a radiation 7a for an NFC communication channel, which cooperates with a radiation 7b of another NFC communication module which is integrated in a mobile device 4 adapted to carry and Apply a special Software or App 13. Said mobile device 4 sends configuration data 10 over the communication channel to the converter 2a. Said configuration data define the properties of the converter 2a and eventually of an analog output sensor 1a, which is connected to said converter via an analog line. The converter 2a is responsible for the preparation of data from the sensor 1a in order to visualize said data in a particular format at an instrument 3*a*. In the current example said instrument 3*a* is a digital instrument (display with pointer) which displays analog information provided through a digital bus (e.g. NMEA bus) and controlled by said converter 2*a*. The converter 2*a* eventually allows also for programming the instrument 3*a* through said digital bus.

FIG. 16 shows basically the same as FIG. 15, however, the instrument is a display 3*b* such as an LC display, an LED display, an OLED display, like a screen to present digital information like graphs, figures, colors or the like. In general in this application the term instrument refers always to a device which shows data on a display or the like. It could also refer to data which are projected on a screen or on a panel. In that case the display device would include also the projector.

When programming the converter 2*a* the following data will be transmitted from the mobile device 4: which sensor 1*a* is connected, what kind of data will this sensor 1*a*deliver (or which of those data delivered will be recognized as relevant data and in which data format will those data be converted and sent through the digital bus to the instrument 3*b*.

FIG. 17 shows a similar setting as FIG. 15 however here several sensors 1*a* ($1a^i$, $1a^{ii}$, $1a^{iii}$) feed sensor data through several converters 2*a* ($2a^i$, $2a^{ii}$, $2a^{iii}$) into one digital bus in order to feed in on instrument 3*al*. This Instrument may now display all values of all three sensors 1*a*, however, in this example the instrument 3*a*allows only one of said sensor data to be displayed. Said instrument $3a^i$ is provided with an NFC module to create radiation 7*a* for said communication channel. Through said communication channel configuration data 10*i* are being transmitted to said instrument $3a^i$ in order to program the instrument, to select from the received sensor data and to display only the selected ones. Certainly, it could be programmed to switch between said different sensor data and display one after the other or only those whiches threshold value is reached or the like. Eventually the converters $2a^i$ to $2a^{iii}$ are programmed in order to define certain threshold for certain sensor data. Not shown in this figure are the NFC modules of the converters 2*a*.

The mobile device 4, however, can be used to program not only the instrument 3*al* but also the converters 2*a*.

FIG. 18 shows a universal display 3*b"* which was programmed so that different data are displayed in the proper and defined/programmed format: an alternating time 9 or any other data are displayed in addition to the values of the sensors 1*a* and 1*b*. It is noted that in this example the sensor 1*b* is a digital sensor and hence its converter 2*b* converts digital to digital signals.

FIG. 19 shows a variant to the setting of FIG. 18: the NFC communication channel between the display $3b^i$ and the mobile device $4^i$ is used not only for programming the display $3b^i$ but also to load display data from the display up to the mobile device $4^i$ so that a user 8 may look either on the instrument $3b^i$ or on the mobile device $4^i$ in order to see the requested data from the sensors 1*a* and 1*b*.

In all examples and figures up to here, the switch 5*a* of said examples can be either in the switch on or switch off mode and the sets will still work with regard to programming the converter, because the NFC module in the converter is of that kind that it may work under electrical power but also when the switch is off. This is because said NFC module is adapted to operate also without external power supply. It gets the signals and the electricity need for operation out of the radiation 7*b* from the mobile device and is adapted to install the configuration data after the converter was switched on.

FIG. 20 presents a further example of a system with three instruments 3*a*,3*b*, which instruments are all equipped with NFC modules and hence allow to be programmed accordingly—as explained above. Since all these instruments are connected via the digital bus, they can display in real time whatever they are programmed to display. In case their NFC fields are very close to each other the App $13^i$ has eventually a special feature in order to allow the simultaneous programming of all instruments 3*a* and 3*b*. This feature saves time. However, in other examples a point to point feature of said NFC fields will be preferred not a point to multi point programming. In this shown example the switch of the system is on. However as seen from the converters 2*a* ($2a^{i\text{-}iii}$) no radiation signal is emitted. This is because the NFC module of those converters 2*a* ($2a^{i\text{-}iii}$) is specially equipped with an internal switch. Said internal switch allows for switching off said NFC module from excitation. The advantage of this measure is that third parties may not actively detect that said converters $2a^{i\text{-}iii}$ are equipped with NFC modules. However, said NFC modules are adapted as to react also passively on a proper radiation signal 7*b* of a mobile device 4. In the mood of such reaction, a code signal is provided to wake the NFC modules up.

FIG. 21 shows a special case for which the inventive system is highly useful: The instrument $3a^i$ is broken, symbolically indicated by a broken signal 6. Compared to the situation of FIG. 20, it is now not possible to view the sensor data to be presented on this instrument $3_a{}^i$.

Here comes the inventive solution: by changing the operation mode of the display 3*b* to an instrument which shows alternating sensor data, the same display 3*b* displays sensor data from two sensors instead of only the sensor data from only one sensor. In other words, instrument 3*b* bypasses the broken instrument $3a^i$ so that the whole system is still completely operative. Certainly, in combination with the preferred option of FIG. 19 (showing sensor data also on the mobile device $4^i$) the broken display $3a^i$ could be also substituted by displaying the sensor data on the mobile device 4.

FIG. 22 symbolizes the advantage of the invention when operating with instruments alone (without converters): common displays equipped with an NFC module can be reprogrammed to change their behavior or properties: in the first left part of FIG. 22 the instrument 3*b* which was programmed to display tank sensor data is reprogrammed/reconfigured by the help of a mobile device 4 and the NFC radiation 7*a* and 7*b* in order to display the Info 2sensor data instead of the data. Later (in the middle of FIG. 22) a further reconfiguration is undertaken. The same instrument 3*b* turns now into a different indicator (Info 3 instead of Info 2, as shown in the right part of FIG. 22.

In other words, at a control panel only one working instrument would be necessary in order to provide control persons with enough data from various different sensors. Said person may control via NFC the kind of data to be presented upon his/her wish.

This aspect of the invention may be used in combination with the system comprising also a converter but also independently from this. This part of the invention basically creates a universal instrument, which installed or in the box might be configured from external through NFC and a mobile device.

This invention provides the advantage also that installed instruments can be configured according to the wish of a user. Imagine two round instruments behind the steering wheel of a car. The left instruments show the rpm and the right instrument shows the speed in e.g. km/h.

With the help of the invention the information shown on the two instruments can be switched (exchanged) without using a screwdriver just by NFC communication channel and the mobile device. Equally easy the unit of measure/indication may switch from km/h to miles/hour simply by using his mobile phone/device 4 incl. NFC module and with the respective App 13.

FIG. 23 shows symbolically how basic displays 3b out of the box are transformed into dedicated displays/instruments 3b$^{i-iii}$ by the inventive use of the mobile device 4 and the communication channel through the NFC radiation.

The same FIG. 23 may also show symbolic, that a basic display 3b may include also a programmable converter who then controls external displays 3b$^{i-iii}$. In that example the basic display would be connected to various sensors as well (not shown). This would be an integrated solution, where the room for a converter is integrated into the basic display.

Figure 24:
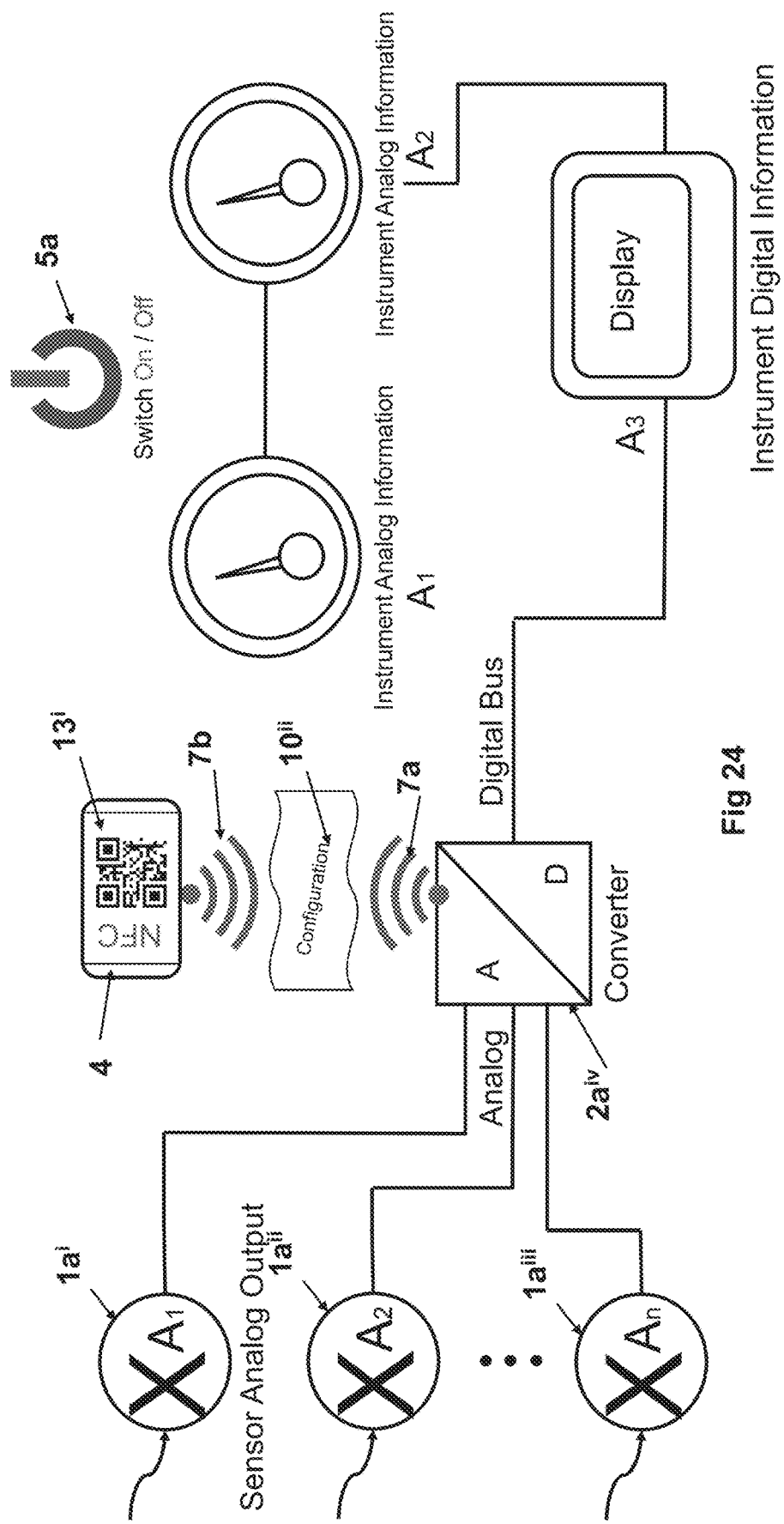

FIG. 24 discloses another embodiment of the invention whereby a single converter 2a$^{iv}$ has on its entrance side several analog sensor input lines which are all together transferred into digital signals exiting through a digital bus (e.g. NMEA 2000®). The way how the single sensor input is treated is defined via the configuration protocol 10ii transmitted into the converter through the NFC modules.

Figure 25:
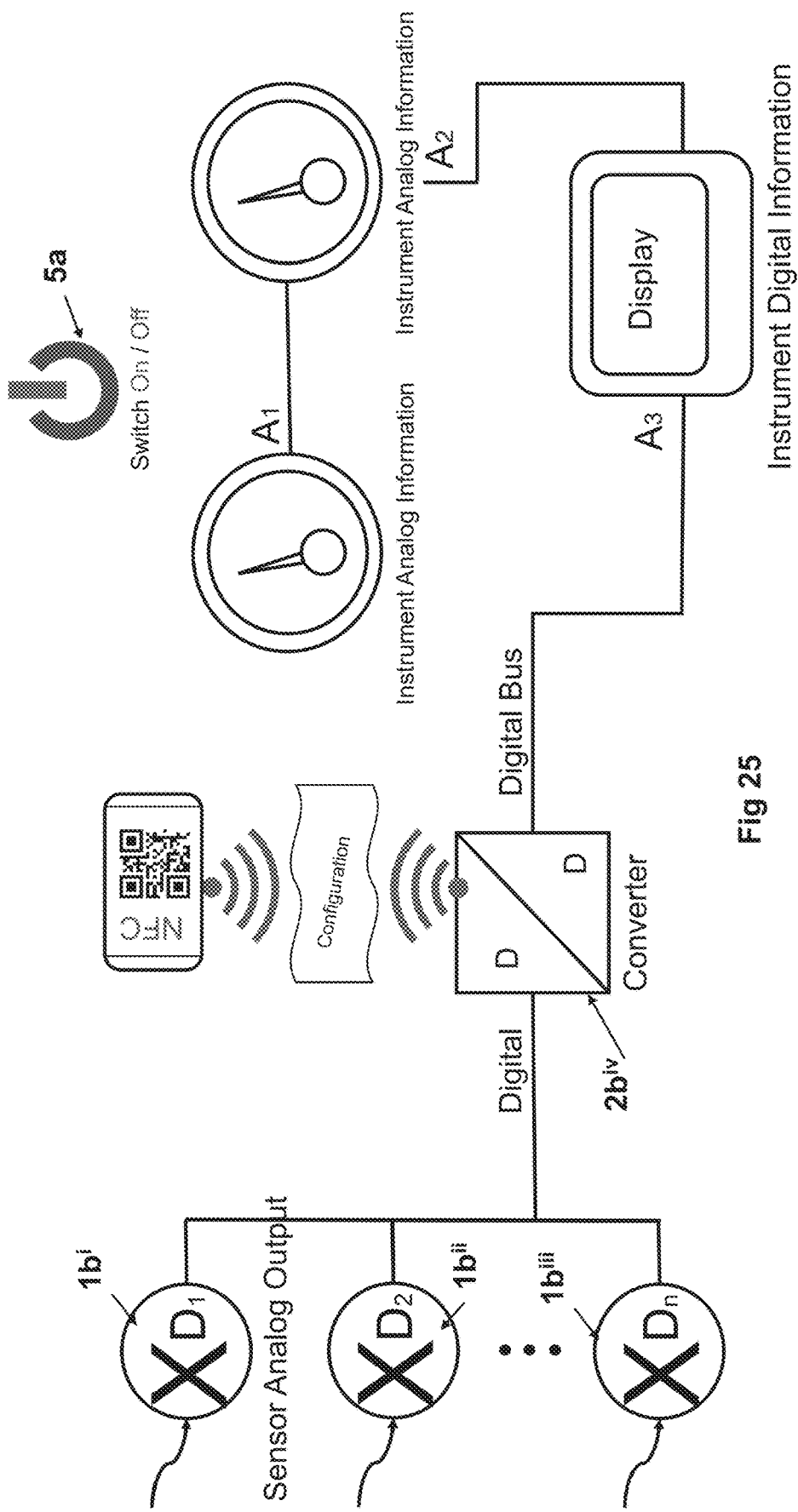

FIG. 25 shows a similar configuration as FIG. 24. However, the multiple sensors 1bi-iiiare digital sensors/at least provide digital output which is connected through a digital bus to a digital/digital converter, which can be addressed through the NFC module in the above described way.

Figure 26:
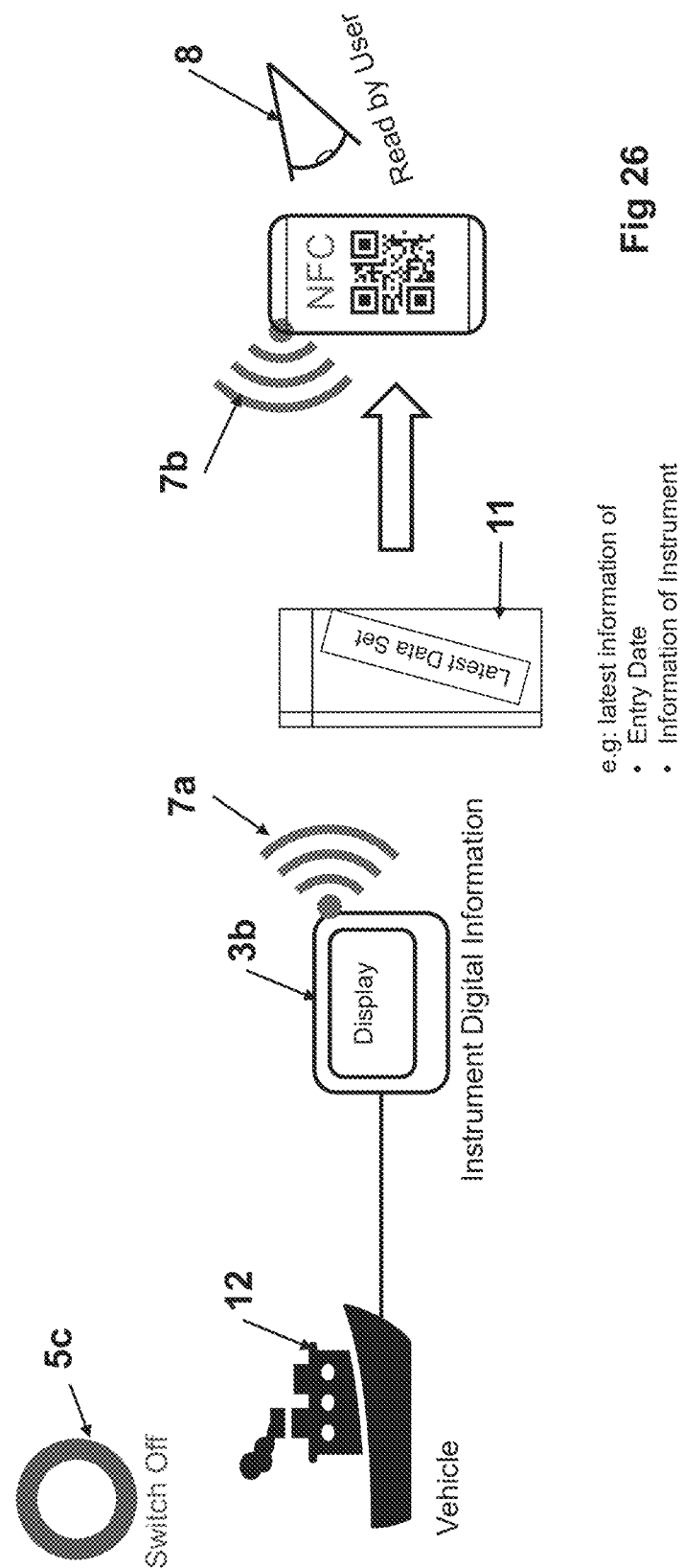

FIG. 26 refers to a completely different topic of the same invention: Instruments 3b on vehicles 12 normally display data, when the vehicle 12 is under power and the instruments 3b are on. With the invention—namely having an NFC module 7a integrated in an instrument 3b with the feature that said NFC module 7a can transmit data also in the off status of said instrument 3b it is possible to read out sensor data or display data from said instrument 3b even if it is off power. As shown the mobile device 4 works as a read out for a user. The NFC module 7b in said mobile device 4 certainly is active and generates enough radiation in order to wake up the NFC module of the instrument 3b. However, the latter is configured to store and transmits the latest Data set of said instrument 3b. With this inventive arrangement it is possible that e.g. custom authorities or maintenance personnel visit ships, trucks etc. and read out the data of their instruments without having the need to start engines, set the vehicle and its instruments under power etc.

This invention helps also to control and check travel, vehicle status data of cars, trucks or other wheeled vehicles on the road. Officials may read out data by just connecting their mobile devices with the instruments or Blackbox of the vehicle not depending on the assistance of the vehicle driver and the condition of the engine etc.

Figure 27:
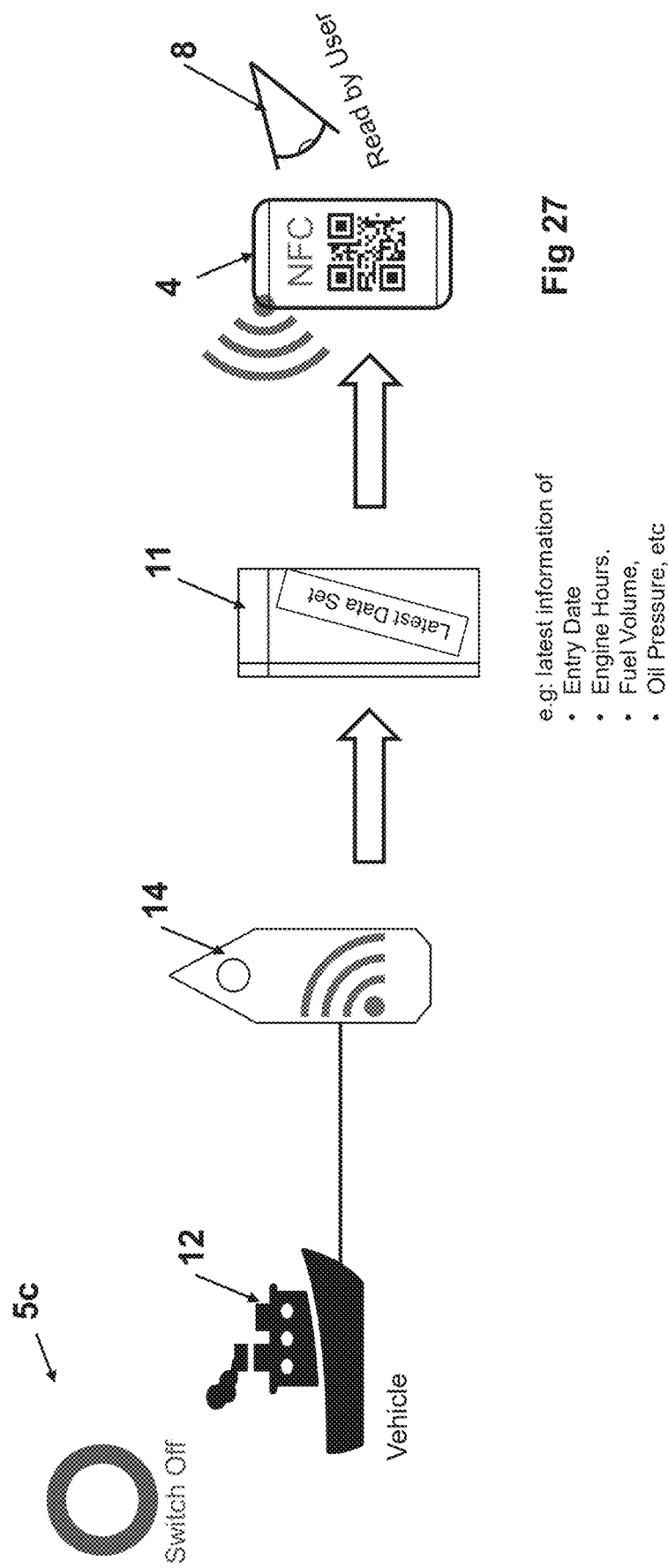

FIG. 27 refers to a further development of the invention explained with FIG. 26: while in FIG. 26 the readout of the instrument 3b is done with NFC at the instrument 3b, the read out of instrument data is done remote from said instrument 3b. The instrument (not shown) is connected with a data bus to an information tag 14, which basically allows the NFC module of a mobile device 4 to read out and display sensor data or the latest data set 11 to a user 8. This is utilized either by storing said latest data set at said information tag 14 or by allowing after excessing said information tag 14 to enter and read out the instrument over the digital bus which connects the information tag 14 with the instrument 3b.

FIG. 28 shows more details of an inventive converter. The converter consists of the basic converter 2c which is connected to any sensor on the right-hand side. The basic converter 2c is powered over a power supply device 15. The digital exit of the basic converter 2c feeds in a processor 16 with a flash memory 17. Between the basic converter 2c and the processor 16 is a galvanic isolation 18. The processor 16 is connected to a transceiver 19 which exits signals to a CAN or NMEA bus 20. The processor is connected to the NFC module 21 with an antenna 22 in order to radiate radiation 7a for opening the NFC communication channel. All these details are integrated in an inventive converter 2a as shown in the other figures.

About the same construction is provided for digital/digital converters 2b.

Drawing page 19 discloses in FIG. 29 through 37 a practical example of the invention in the format of an intelligent battery sensor system. Said system is adapted to measure the battery parameters. It is connected to the standard negative pole terminal of the battery.

Figure 30:
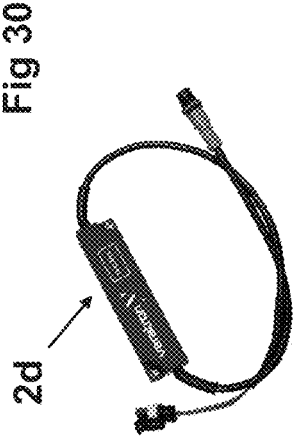
Figure 29:
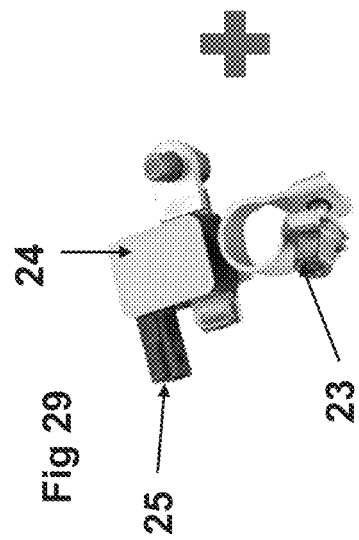
Figure 31:
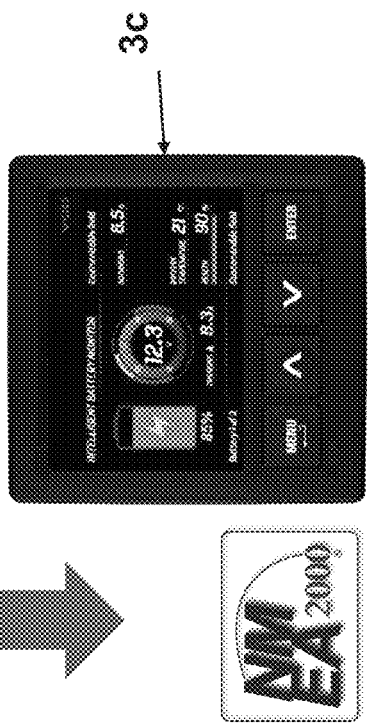
Figure 32:
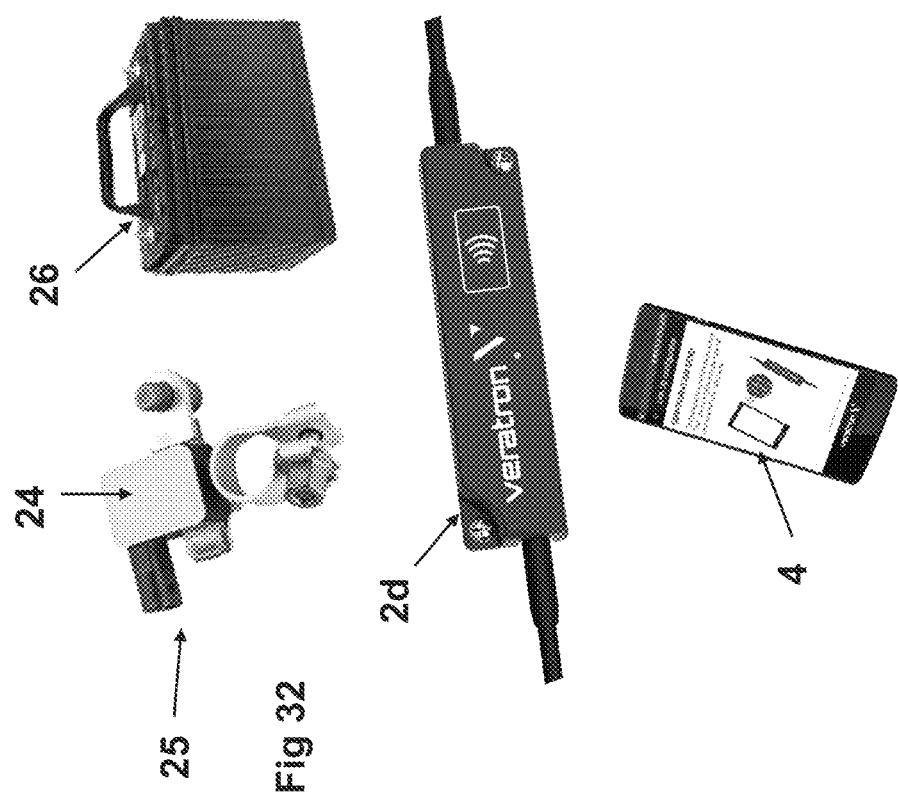

FIG. 29 discloses a dedicated harness 23 for connecting to the battery pole, an electrical sensor 24 for sensing at least the current flowing in or out of the negative pole of a battery and a connector plug 25 to connect to the converter 2d shown in FIG. 30. The converter 2d has a cable to be connected to said connector plug 25 and an exit to be connected via an NMEA bus to a display 3c shown in FIG. 31. The converter 2d can be configured with a mobile device 4 shown in FIG. 32.

A battery 26 is shown as an example, but any other kind of batteries might be provided with said inventive electrical battery sensor 24. In the symbolic presentations said sensor would bear the number 1a or 1b.

In this arrangement the configuration from the mobile device 4 to the converter contains the battery settings to the electrical sensor 24 and the parameters which should be displayed on the display 3c. A supply voltage is taken from the battery. However, the NFC module would work also when not energized through the battery.

Figure 33:
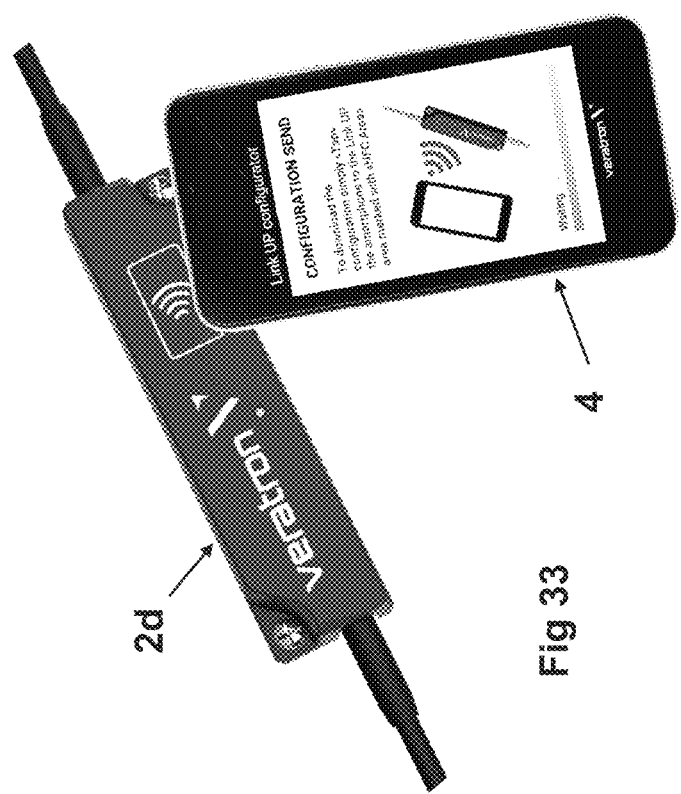

FIG. 33 shows how the configuration is done by holding the mobile device 4 above or close the converter 2d.

Figure 34:
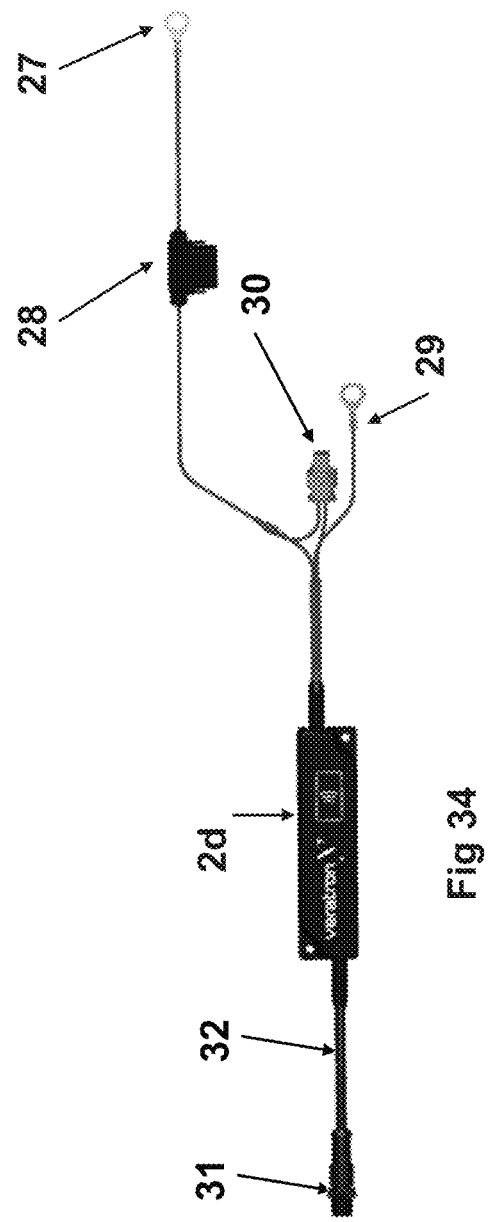

FIG. 34 shows the wire harness of the converter comprising a plus connector 27, a fuse device 28, a negative connector 29 and a plug 30 to connect to the connector plug 25. It further shows the NMEA bus cable 32 and a bus plug 31 to connect to the bus system which leads also to the display 3c. This system transmits the battery data over NMEA 2000® by using standardized PGNs, where available, to ensure maximum integration with other NMEA 2000® capable devices.

Such system can be directly integrated into a boats electrical system e.g. through the standardized NMEA 2000® protocol. The battery sensor system can be wirelessly programmed with any mobile phone containing NFC (second mobile device) and the relevant App to set the battery capacity, its instance and the related alarms. Such a system helps to prevent chronic battery problems as it delivers in real time: faulty charging system overcharging or lower charging, faulty battery compartment overheating preventive maintenance "battery aging". Especially the real-time measurement during the charging/discharging process of this new system is of great advantage to the users, This new system informs the user about the current energy status of his/her vehicle/boat, allowing to plan the energy supply. E.g. on boats week batteries are always the main source of trouble.

The exemplary battery sensor and converter work preferably with 6-16.6 V at a permanent load current of +155A, Maximum current +1500A (at 500 ms). It has a nominal resistance (shunt) of 100 μΩ. The operating Temperature is −40° C. to 115° C. and it is integrated in a packaging which provides protection class IP 6K7. It can be used for a single battery capacity of 249 Ah.

Figure 35:
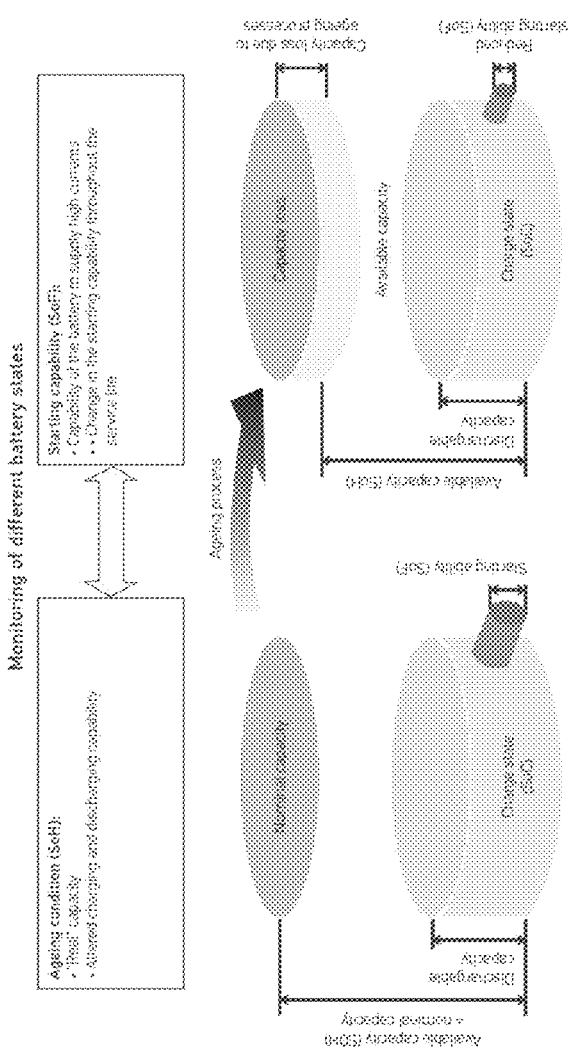

FIG. 35 shows two different views on two different battery states. The configuration of the converter allows to display e.g.:

SOC: The current status of the battery, defined in percentage. Other definitions could be possible.

SOH: The aging status of the battery, defined in percentage. Other definitions could be possible.

SOF: The future cranking health of the engine based on the current measured current and voltage of the battery and or the charging system.

Figure 36:
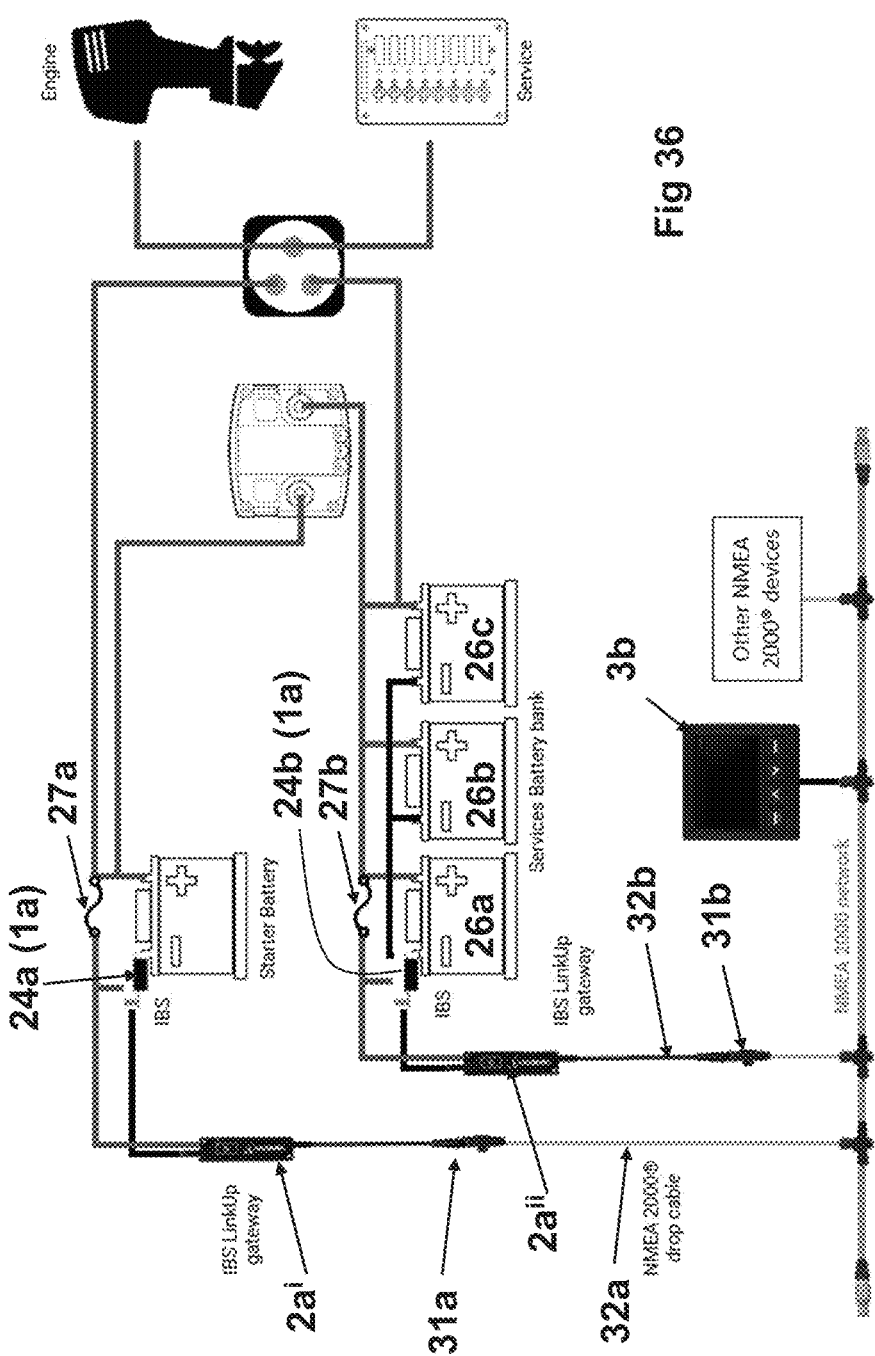
Figure 37:
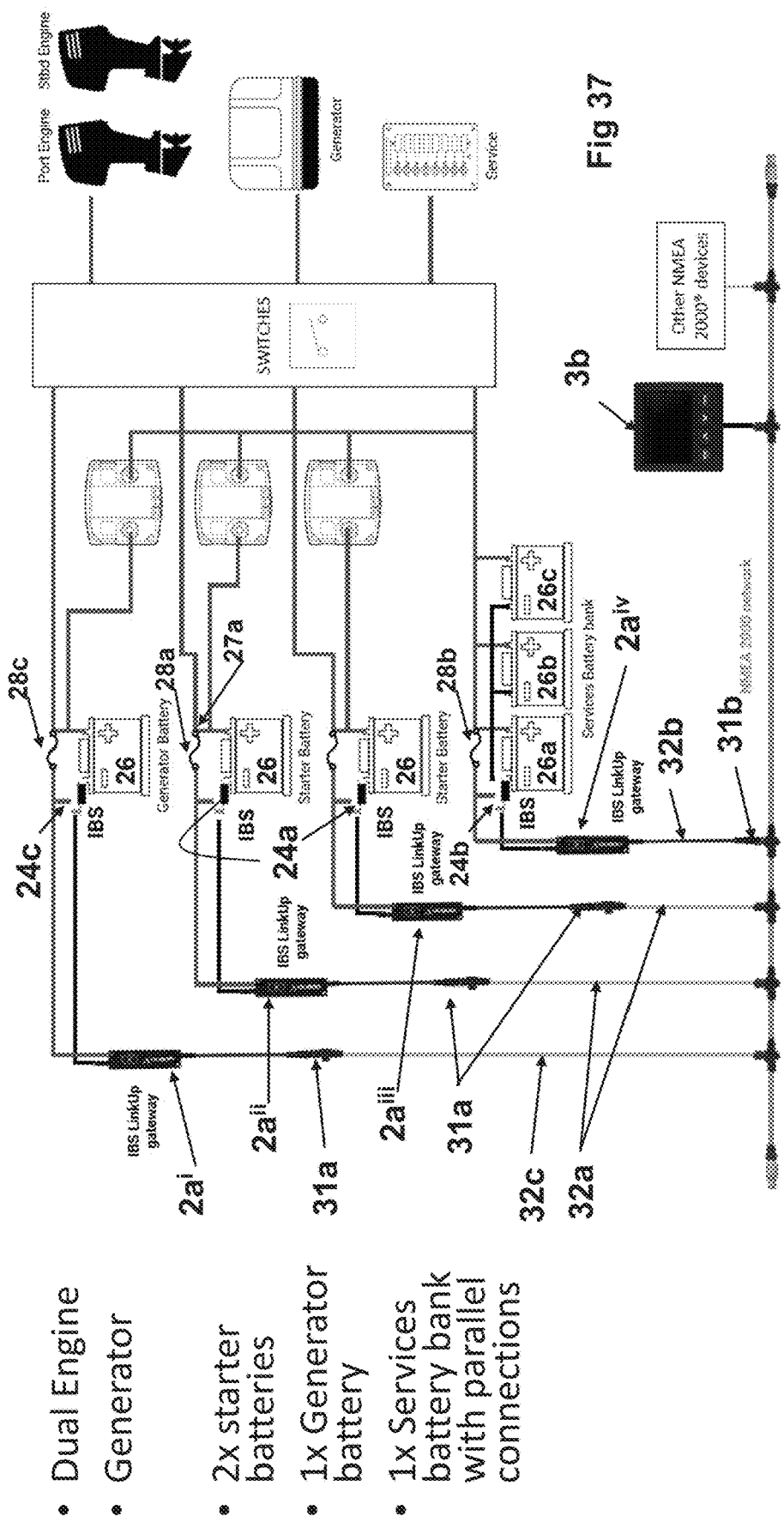

FIG. 36 to 37 show self-explanatory embodiments of the invention for battery surveillance systems on boats with one or two engines. It is to be noted, that for each battery a sensor 24 (14a,24b,24c) might be useful, but as shown for a battery bank also a single sensor 24 might be employed.

Figure 38:
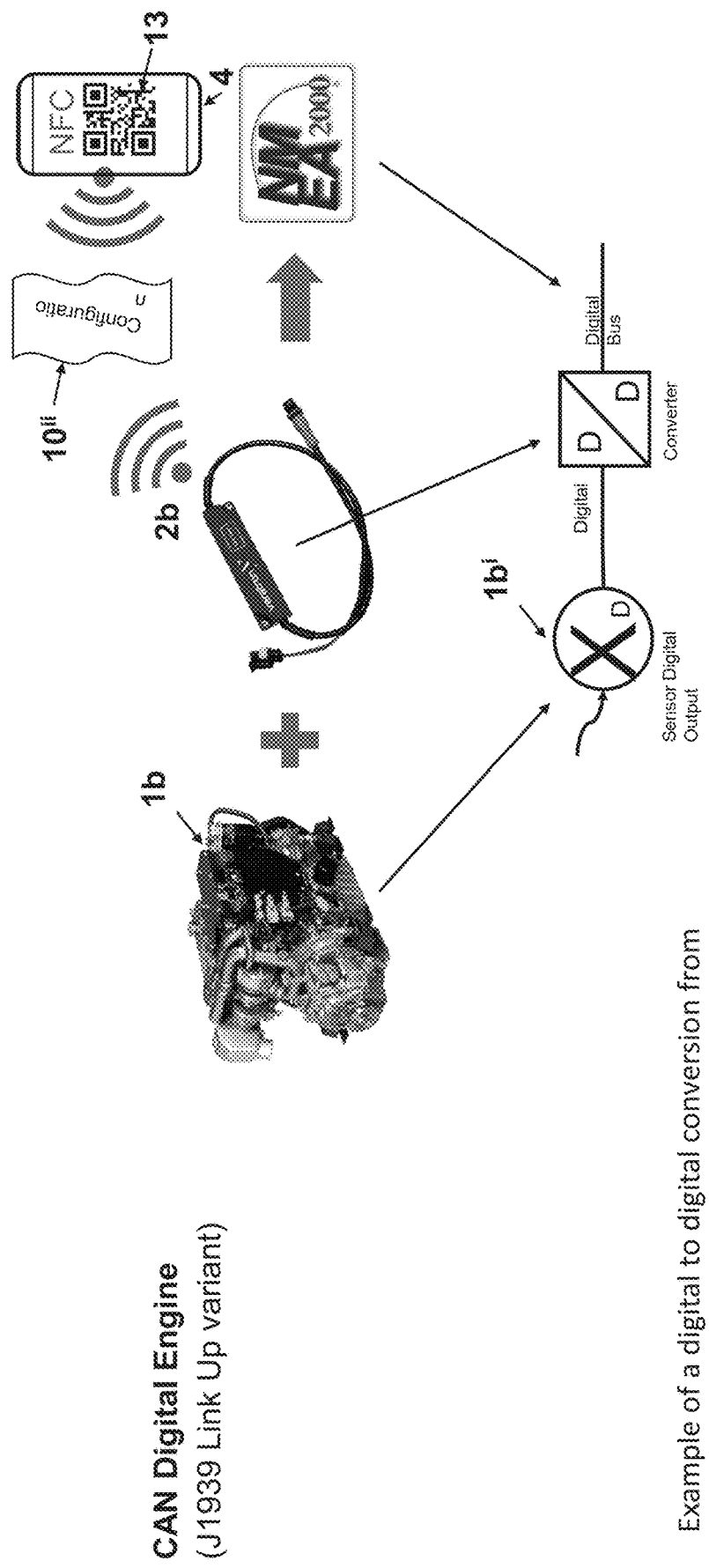

FIG. 38 relates to FIG. 18 and the reference numerals there and symbolizes an example of a digital to digital conversion from an engine's bus to displays via the inventive converter which is programmable via an NFC communication channel. In this drawing only one sensor 1b is depicted, however from an engine a data bus e.g. CAN Digital Engine bus delivers a stream of various sensor data to the converter (or a plurality of converters) which are configured by the mobile device not shown. The output data of the converter (or plurality of converters) enters the bus system for the displays in order to address them properly— as configured by the user via the NFC communication channel.

FIG. 39 shows a more simple application of the invention—also with reference to FIG. 18 and the reference numerals there: a common fuel sensor with analog data output is connected to the inventive converter which is again configured through an NFC communication channel by a mobile device 4. The term Link up is used as a future trademark for the converter with the integrated NFC module to build up an NFC communication channel.

FIG. 40-43 show the variant of the invention whereby with the help of the NFC communication channel various instruments can be substituted. These figures relate to FIG. 23 its reference numerals and explanation above.

In FIG. 40 a typical scenario from prior art is seen: very many displays representing different gauges. The dash is overcrowded with single-function gauges. If a gauge fells out due to a technical problem or damage it is often difficult to find proper replacement. Here the Invention helps: a universal instrument is offered, which can be configured through the NFC-communication channel according to the explanations above, so that it becomes the proper gauge. Of course, several gauges or instruments can be integrated into one display also. These can be seen by switching or with alternating time.

Figure 41:
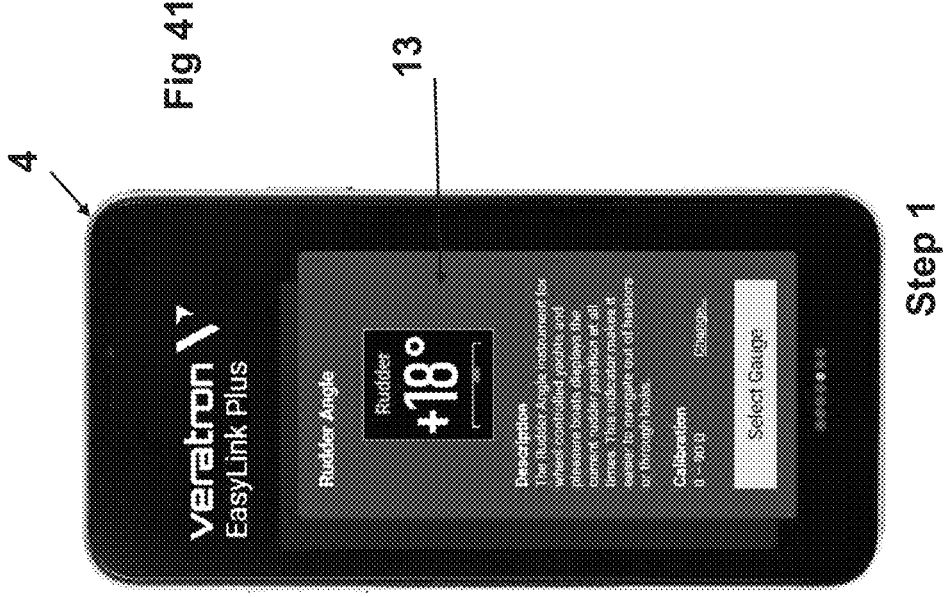

FIGS. 41 to 43 show the steps how to configure such universal instrument into the required instrument for new use.

In FIG. 41 it can also be seen that sensor Info-normally to be displayed on an instrument can be displayed also via the mobile device 4. Which in turn can also be used in emergency cases as THE display/instrument. Such use can also be in parallel with an instrument, as can be seen from FIG. 42.

FIG. 43 shows a universal instrument which was transformed into a ruder gauge by the inventive measures.

The description in the drawings are self-explanatory. As the skilled person understands the above example of use of the invention is one of many.

From a different viewpoint it can be stated that the invention allows for a very convenient upgrade of analogue sensors to be used in a digital bus system and to be read out finally at a fully digitalized instrument. The bus system could be e.g. the NMEA 2000®. That means that e.g. conventional boats can be refurbished on the controlling side easily without changing the various conventional sensors.

Currently the invention will be available in five typical different scenarios:

Generic resistive (level sensors, temperature sensors, pressure sensors and the like)

Pyrometer

Intelligent battery sensors as described above,

Combined Temperature/Pressure sensors,

SAE J1939 Protocol (is a CAN based protocol for commercial vehicles)

Most preferable it will be delivered in a plug and play installation with a standard Micro-C M12 connector to interface the NMEA2000® network with need of additional adaptors. No dedicated power supply is necessary, as the converter gets it power directly from the bus network e.g. from the NMEA200® bus network. Preferably an LED is embedded in the converter to show the status of the first device and its configuration at any time. This avoid commissioning and troubleshooting.

It was never so easy to configure and adapt common analog sensors to digital networks:

The user launches the App on his/her mobile device and defines he settings (configurations) through a user-friendly interface of the App on the mobile device. After that hold simply the mobile device in proximity of the converter in order to transfer the configuration/settings to it.

From that moment the converter knows what he must do in order to provide a proper reading of sensed values with common (analog) sensors on new digital instruments.

Of course, the measures which are specified in the individual exemplary embodiments of all FIGS. 1-37 and in the introduction to the description and in the claims can also be used Appropriately in combinations other than those illustrated here, and developments, even if not specified individually, are at the discretion of the person skilled in the art. Also the teaching of the said US Patent application and the first mentioned German Patent application might be observed.

The invention claimed is:

1. A non-transitory storage medium containing instructions which when executed, by one or more processors of a mobile device cause the mobile device to send configuration data to a first device which is a programmable converter device specifically adapted to convert analog signals into digital signals or first digital signals into second digital signals, and which programs said first converter device to:

produce configuration data for the first converter device on the mobile device, including data format specifications for sensor data;

allow output status information by the mobile device in an active NFC communication mode;

continuously detect status feedback of said first converter device operated in a passive NFC communication mode to the mobile device in the active NFC communication mode; and if the detected passive device is the first converter device, transmit configuration data from the mobile device into the first converter device in order to allow said first converter device to operate as configured;

wherein said first converter device is connected to at least one sensor and converts data to be received from said sensor according to a particular NFC-signal configuration acquired through an NFC link from the mobile device.

2. The non-transitory storage medium of claim 1 containing instructions which when executed, by one or more processors of a mobile device cause the mobile device to:
receive sensor data from a first device into said mobile device through an NFC communication channel;
display said sensor data on the mobile device in order to allow a user to inspect said sensor data on said mobile device;
wherein said first device is either a converter for converting data form a sensor to a display or wherein said first device is an instrument/display which is adapted to receive sensor data, from a converter for converting data form a sensor to be displayed on a display.

3. The non-transitory storage medium of claim 1 wherein said instructions contain configurating elements which when executed by one or more processors of a mobile device cause the mobile device to transfer said configurating elements to the instrument/display in order to change the properties of said instrument/display in relation to the sensor data received from said converter.

4. The virtual or physical non-transitory storage medium of claim 1 wherein the converter is adapted to convert analog signals into digital signal or to convert first digital signals into second digital signals which converter is adapted to convert received analog data or received digital data from at least one sensor according to a particular NFC-signal configuration acquired through NFC link from an external mobile device, so as to either change the way of converting said signals between analog and digital or between digital and digital, and/or to feedback programming/controlling data (analog or digital) in order to modify the properties and characteristics or working mode of said sensors or of said converter or of a display connected to said converter.

5. The non-transitory storage medium of claim 4 wherein said converter contains instructions which also feedback programming/controlling data (analog or digital) in order to modify the properties or working mode of indicating devices like displays, optical or acoustical signals or the like, connected to said converter, which have the purpose of presenting information gathered by said converter from said sensors.

6. The non-transitory storage medium of claim 4, wherein the converter is equipped with an NFC module working in the active and/or passive communication mode, adapted to cooperate with an external mobile device and the NFC module thereof in a manner that the mobile device amends the properties or configuration of said converter so that converter output signals instructing a digital display to display converter input signals from at least one sensor to users of the digital display.

7. A sensing and displaying system comprising the non-transitory storage medium of claim 1 wherein the sensor senses information and delivers information data to the converter when in operation;
said converter converts said information data to display data and delivers said display data to a display when in operation;
said converter contains a microprocessor as a controller and a first NFC communication module which is connected to said microprocessor;
said microprocessor contains modifiable instructions to run said microprocessor and said converter;
said modifiable instructions are adapted to be modified through input data which can be delivered to said microprocessor through said NFC communication channel;
wherein the function of said converter can be adapted according to an instruction App which can be loaded into a mobile device or mobile phone which employs a second NFC communication module, which will be in communication with said first NFC communication module, when in communication mode in order to program said microprocessor.

8. The system of claim 7, wherein when programming the converter in a configuration mode, the following instruction data will be transmitted from the mobile device to the microprocessor of said converter:
which sensor is connected,
what kind of data will this sensor deliver to the converter or which of those data delivered will be recognized as relevant data and
in which data format will those data be converted and
in which data format will those data be sent through the digital bus to the display/instrument when in use.

9. A virtual non-transitory storage medium or physical non-transitory storage medium containing instructions which when executed, by one or more processors of a mobile device cause the mobile device to send configuration data to a first device which is an independent adaptable analog/digital or digital/digital converter device and which programs said converter device to:
produce configuration data for a first converter device on the mobile device;
allow output status information by the mobile device in an active NFC communication mode;
continuously detect status feedback of said first converter device operated in a passive NFC communication mode to the mobile device in the active NFC communication mode; and
if a detected passive device is the first converter device, transmit configuration data from the mobile device into the first converter device in order to allow said first converter device to operate as configured;
wherein said first converter device is connected to an analog or digital sensor and converts data to be received from said sensor.

10. The virtual or physical non-transitory storage medium of claim 9 containing instructions which when executed, by one or more processors of a mobile device cause the mobile device to:
receive sensor data from a first device into said mobile device through an NFC communication channel;
display said sensor data on the mobile device in order to allow a user to inspect said sensor data on said mobile device;
wherein said first device is either a converter device for converting data form a sensor to a display or wherein said first device is an instrument/display which is adapted to receive sensor data, from a converter device for converting data form a sensor to be displayed on a display.

11. The non-transitory storage medium of claim 9 wherein said instructions contain configurating elements which when executed by one or more processors of a mobile device cause the mobile device to transfer said configurating elements to the instrument/display in order to change the properties of said instrument/display in relation to the sensor data received from said converter device.

12. The virtual or physical non-transitory storage medium of claim 9 wherein the converter converts analog signals into digital signals or converts first digital signals into second digital signals which converter device is adapted to convert received analog data or received digital data from at least one sensor according to a particular NFC-signal configuration acquired through NFC link from an external mobile device, so as to either change the way of converting said signals between analog and digital or between digital and digital, and/or to feedback programming/controlling data (analog or digital) in order to modify the properties and characteristics or working mode of said sensors or of said converter device or of a display connected to said converter device.

13. The virtual or physical non-transitory storage medium of claim 12, wherein said converter device contains instructions which may also feedback programming/controlling data (analog or digital) in order to modify the properties or working mode of indicating devices like displays, optical or acoustical signals or the like, connected to said converter device, which have the purpose of presenting information gathered by said converter device from said sensors.

14. The virtual or physical non-transitory storage medium of claim 12, wherein the converter device is equipped with an NFC module working in active and/or passive mode, adapted to cooperate with an external mobile device and its NFC module in a manner that the mobile device amends the properties or configuration of said converter device so that converter device output signals are effective in instructing a digital display to display relevant converter input signals from at least one sensor in a relevant way for users.

15. The virtual or physical non-transitory storage medium of claim 9 comprising a sensing and displaying system comprising the analog or digital sensor which senses information and delivers information data to the converter when in operation;
  said converter converts said information data to display data and delivers said display data to a display when in operation;
  said converter contains a microprocessor as a controller and a first NFC communication module which is connected to said microprocessor;
  said microprocessor contains modifiable instructions to run said microprocessor and said converter;
  said modifiable instructions are adapted to be modified through input data which can be delivered to said microprocessor through said NFC communication channel;
  wherein the function of said converter can be adapted according to an instruction App which can be loaded into a mobile device or mobile phone which employs a second NFC communication module, which will be in communication with said first NFC communication module, when in communication mode in order to program said microprocessor.

16. The virtual or physical non-transitory storage medium of claim 15 wherein when programming the converter in a configuration mode, the following instruction data will be transmitted from the mobile device to the microprocessor of said converter device:
  which sensor is connected,
  what kind of data will this sensor deliver to the converter device or which of those data delivered will be recognized as relevant data and in which data format will those data be converted and
  in which data format will those data be sent through the digital bus to the display/instrument when in use.

* * * * *